(12) United States Patent
Meshkati et al.

(10) Patent No.: US 11,894,907 B2
(45) Date of Patent: Feb. 6, 2024

(54) ANTENNA CONFIGURATION SELECTION FOR USER EQUIPMENT

(71) Applicant: QUALCOMM Incorporated, San Diego, CA (US)

(72) Inventors: Farhad Meshkati, San Diego, CA (US); Jyothi Kiran Vattikonda, San Diego, CA (US); Thomas Christol, Boulder, CO (US); Raghu Narayan Challa, San Diego, CA (US); Mouaffac Ambriss, San Diego, CA (US); Arvind Vardarajan Santhanam, San Diego, CA (US); Feng Lu, Saratoga, CA (US); Ting Kong, San Diego, CA (US); Uzma Khan Qazi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 17/301,417

(22) Filed: Apr. 1, 2021

(65) Prior Publication Data
US 2021/0314055 A1 Oct. 7, 2021

Related U.S. Application Data

(60) Provisional application No. 63/005,034, filed on Apr. 3, 2020.

(51) Int. Cl.
*H04B 7/08* (2006.01)
*H01Q 1/24* (2006.01)
*H04B 17/318* (2015.01)

(52) U.S. Cl.
CPC ........... *H04B 7/0834* (2013.01); *H01Q 1/243* (2013.01); *H04B 17/318* (2015.01)

(58) Field of Classification Search
CPC .. H04B 7/0834; H04B 17/318; H04B 7/0811; H01Q 1/243; H04W 4/80; H04W 4/70
See application file for complete search history.

(56) References Cited

U.S. PATENT DOCUMENTS 6,486,832 B1 * 11/2002 Abramov ............. H01Q 1/2258
343/754
2016/0269132 A1 9/2016 Clark et al.
(Continued)

FOREIGN PATENT DOCUMENTS

EP 1342291 A1 9/2003

OTHER PUBLICATIONS

International Search Report and Written Opinion—PCT/US2021/025479—ISA/EPO—dated Aug. 30, 2021.
(Continued)

*Primary Examiner* — Wei Zhao
(74) *Attorney, Agent, or Firm* — Haynes and Boone, LLP

(57) ABSTRACT

Wireless communications systems and methods related to wireless communications in a system are provided. A user equipment (UE) may determine a plurality of antenna configurations for a plurality of channel frequencies. The UE may determine a set of signal strengths for at least one beam received at one or more antenna configurations of the plurality of antenna configurations for at least one of the channel frequencies. The UE may select, based on the set of signal strengths, a first antenna configuration of the plurality of antenna configurations. After selection of the first antenna configuration, the UE may communicate with a base station, in one or more channel frequencies based on the first antenna configuration.

55 Claims, 8 Drawing Sheets

(56) References Cited

U.S. PATENT DOCUMENTS

| 2019/0088056 | A1* | 3/2019 | Telljohann | G07C 9/00309 |
| 2019/0253966 | A1* | 8/2019 | Park | H04L 5/0091 |
| 2020/0323032 | A1* | 10/2020 | Kim | H04W 76/30 |
| 2021/0067225 | A1* | 3/2021 | Mo | H04L 5/001 |
| 2022/0166468 | A1* | 5/2022 | Go | H04L 5/00 |

OTHER PUBLICATIONS

NTT DOCOMO, et al., "Evaluation for Beam Management", 3GPP TSG RAN WG1 Meeting #89, 3GPP Draft, R1-1708453_BM_Evaluation_Final, 3rd Generation Partnership Project (3GPP), Mobile Competence Centre, 650, Route Des Lucioles, F-06921 Sophia-Antipolis Cedex, France, vol. RAN WG1, No. Hangzhou, P.R. China, May 15, 2017-May 19, 2017, May 2017 (May 6, 2017), 9 Pages, XP051262459, Retrieved from the Internet: URL: http://www.3gpp.org/ftp/tsg_ran/WG1_RL1/TSGR1_89/Docs/ [retrieved on May 6, 2017] the whole document.
Partial International Search Report—PCT/US2021/025479—ISA/EPO—dated Jul. 7, 2021.

* cited by examiner

ANTENNA CONFIGURATION SELECTION FOR USER EQUIPMENT

CROSS-REFERENCE TO RELATED APPLICATIONS

The present application claims priority to and the benefit of U.S. Provisional Patent Application No. 63/005,034 filed Apr. 3, 2020, which is hereby incorporated by reference in its entirety as if fully set forth below and for all applicable purposes.

TECHNICAL FIELD

The present disclosure is directed to wireless communication systems and methods. Certain embodiments can enable and provide techniques for allowing communication devices (e.g., user equipment (UE)) to select an optimal antenna configuration for an antenna panel of the UE.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmW) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

A UE (e.g., a customer premise equipment (CPE)) may include an antenna panel that may be oriented to different spatial directions based on different antenna configurations. The UE may set the antenna panel to a particular antenna configuration and transmit communication signals based on the antenna configuration.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication includes: determining, by a user equipment (UE), a plurality of antenna configurations for a plurality of channel frequencies; determining, by the UE, a set of signal strengths for at least one beam received at one or more antenna configurations of the plurality of antenna configurations for at least one of the channel frequencies; selecting, based on the set of signal strengths, a first antenna configuration of the plurality of antenna configurations; and communicating, by the UE with a base station (BS), in the at least one of the channel frequencies based on the first antenna configuration.

In an aspect of the disclosure, an apparatus includes: a memory; and a processor configured to, when executing instructions stored on the memory, cause the apparatus to: determine a plurality of antenna configurations for a plurality of channel frequencies; determine a set of signal strengths for at least one beam received at one or more antenna configurations of the plurality of antenna configurations for at least one of the channel frequencies; and select, based on the set of signal strengths, a first antenna configuration of the plurality of antenna configurations; and communicate, with a base station (BS), in the at least one of the channel frequencies based on the first antenna configuration.

In an aspect of the disclosure, a computer-readable medium having program code recorded thereon, the program code including: code for causing a user equipment (UE) to determine a plurality of antenna configurations for a plurality of channel frequencies; code for causing the UE to determine a set of signal strengths for at least one beam received at one or more antenna configurations of the plurality of antenna configurations for at least one of the channel frequencies; code for causing the UE to select, based on the set of signal strengths, a first antenna configuration of the plurality of antenna configurations; and code for causing the UE to communicate with a base station (BS), in the at least one of the channel frequencies based on the first antenna configuration.

In an aspect of the disclosure, an apparatus includes means for determining a plurality of antenna configurations for a plurality of channel frequencies; means for determining a set of signal strengths for at least one beam received at one or more antenna configurations of the plurality of antenna configurations for at least one of the channel frequencies; means for selecting, based on the set of signal strengths, a first antenna configuration of the plurality of antenna configurations; and means for communicating, with a base station (BS), in the at least one of the channel frequencies based on the first antenna configuration.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
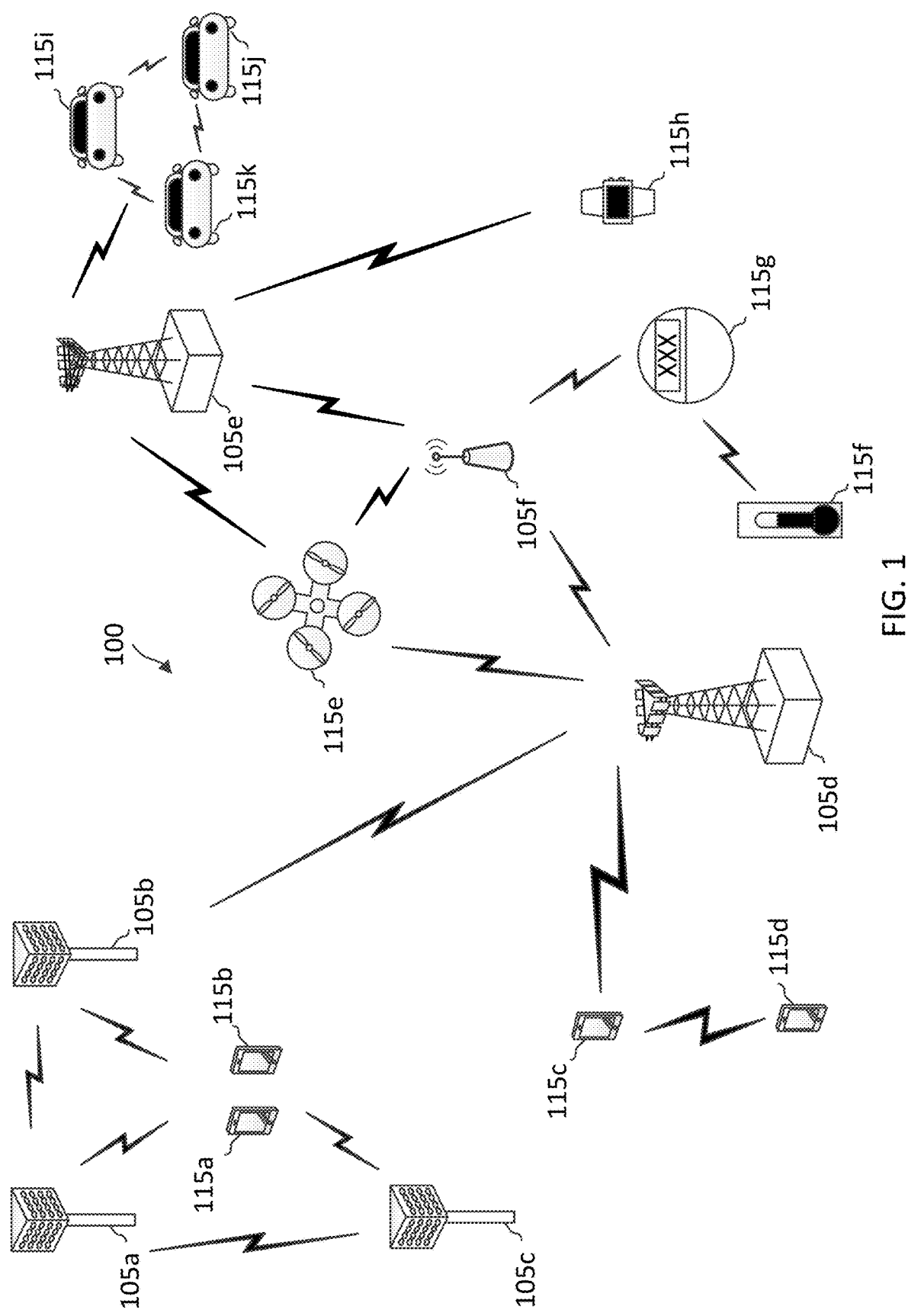
FIG. 1 illustrates a wireless communication network in accordance with one or more aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier TDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an Ultra-high density (e.g., ~1 M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmW) transmissions, advanced channel coding, and device-centric mobility. Scalability of the numerology in 5G NR, with scaling of subcarrier spacing (SCS), may efficiently address operating diverse services across diverse spectrum and diverse deployments. For example, in various outdoor and macro coverage deployments of less than 3 GHz FDD/TDD implementations, SCS may occur with 15 kHz, for example over 5, 10, 20 MHz, and the like bandwidth (BW). For other various outdoor and small cell coverage deployments of TDD greater than 3 GHz, SCS may occur with 30 kHz over 80/100 MHz BW. For other various indoor wideband implementations, using a TDD over the unlicensed portion of the 5 GHz band, the SCS may occur with 60 kHz over a 160 MHz BW. Finally, for various deployments transmitting with mmW components at a TDD of 28 GHz, the SCS may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects or examples set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

In some aspects, each of a BS and a UE may have an antenna panel (may also referred to as a motorized rotatable antenna panel, a panel, or an antenna array) and may apply beamforming techniques to communicate with each other. The antenna panel may be in the form of a single panel, multiple panels, or a motorized rotatable panel. Each antenna panel may include a plurality of antenna ports or elements in a vertical dimension and/or a plurality of antenna ports or elements in a horizontal dimension. The UE may form beams in an array of angular directions by weighting signal phases and amplitudes at the antenna elements. The antenna panel may be associated with a plurality of antenna configurations. An antenna configuration may include parameters that control or are associated with the antenna panel. For example, the antenna configuration may include a set of orientations (e.g., angle) of the antenna panel, a set of channel frequencies for transmitting communication signals based on the panel orientation, and the like.

The present disclosure provides techniques for selecting an optimal antenna configuration of the plurality of antenna configurations for communicating communication signals. For example, the UE may select an optimal antenna configuration of a plurality of antenna configurations and transmit communication signals based on the optimal antenna configuration to the BS. The optimal antenna configuration may refer to a high-quality antenna configuration, for example, where the optimal antenna configuration may be associated with a highest received signal power among a set of beams measured at the UE. Mechanisms for determining the antenna configuration are described in greater detail herein.

FIG. 1 illustrates a wireless communication network 100 in accordance with one or more aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, a customer premise equipment (CPE), or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V) communications among the UEs 115i-115k, vehicle-to-everything (V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the SCS between adjacent subcarriers may be fixed, and the total number of subcarriers (K) may be dependent on the system BW. The system BW may also be partitioned into subbands. In other instances, the SCS and/or the duration of TTIs may be scalable.

In some aspects, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes an UL subframe in an UL frequency band and a DL subframe in a DL frequency band. A subframe may also be referred to as a slot. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. An UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI, OSI, and/or one or more system information blocks (SIBs). The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit an UL communication signal to the BS 105 via a PUSCH and/or PUCCH according to an UL scheduling grant. In some aspects, the BS 105 may communicate with a UE 115 using HARQ techniques to improve communication reliability, for example, to provide a URLLC service.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities.

Figure 2:
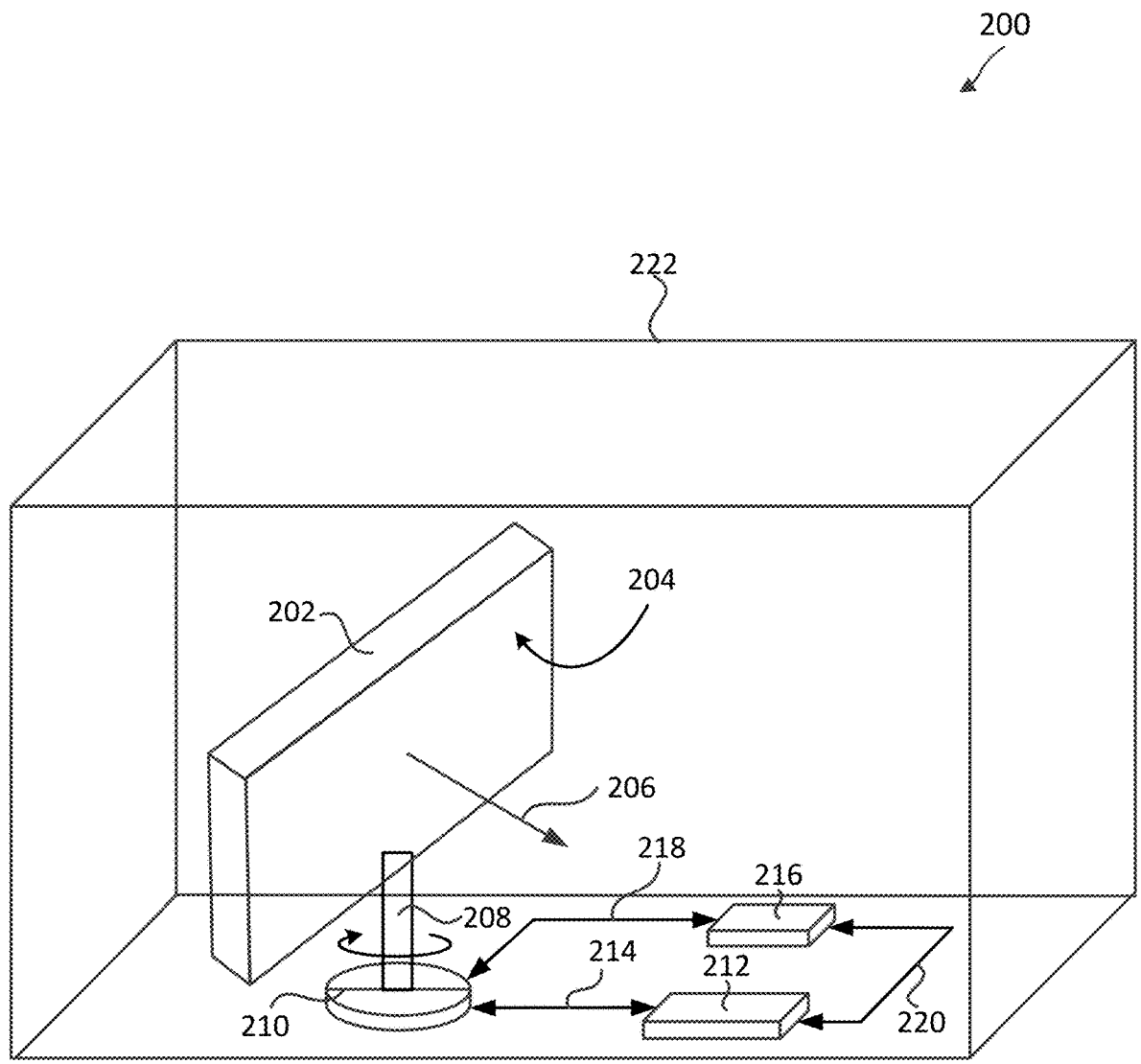
FIG. 2 illustrates an example user equipment (UE) in accordance with one or more aspects of the present disclosure.

FIG. 2 illustrates an example UE 200 in accordance with one or more aspects of the present disclosure. The UE 200 may be a UE 115 discussed above in FIG. 1. In the example illustrated in FIG. 2, the UE 200 includes an antenna panel 202 (may also referred to as a motorized rotatable antenna panel, a panel, or an antenna array), a host processor 212, and a modem device 216. In some aspects of the disclosure, and as shown in FIG. 2, the antenna panel 202, the host processor 212, and the modem device 216 may be situated in an enclosure 222 of the UE 200. In other aspects of the disclosure, the antenna panel 202 may be situated outside of the enclosure 222. In some aspects of the disclosure, the host processor 212 and the modem device 216 may be situated in a single device (e.g., a system-on-chip (SoC) device). In some examples, the host processor 212 is configured to run one or more applications (e.g., at an application layer), such as an operating system and/or other software, on the UE 200.

As further shown in FIG. 2, the antenna panel 202 may be mounted on a rotatable shaft 208, which is coupled to a base 210. The base 210 may include a motor (not shown for ease of illustration) configured to rotate the shaft (e.g., clockwise or counterclockwise) based on control signals from the host processor 212 and/or the modem device 216. The base 210 may enable transfer of signals (e.g., one or more beams from a BS) received at the antenna panel 202 to the host processor 212 and/or the modem device 216. The antenna panel 202 may be a directional antenna having a front surface 204 and a boresight direction 206. In some examples, the boresight direction 206 is perpendicular to the front surface 204 of the antenna panel 202. In some examples, the boresight direction 206 may represent the axis of maximum gain of the antenna panel 202.

The host processor 212 may be in communication with the base 210 via a first data path 214. In some aspects, the host processor 212 may control the rotation of the antenna panel 202 based on one or more control signals provided to the base 210. For example, the one or more control signals may be configured to rotate the shaft 208 (e.g., via the motor in the base 210) to a desired rotational position. Accordingly, the one or more control signals may enable the host processor 212 to control the orientation of the antenna panel 202 as described herein.

The modem device 216 may be in communication with the host processor 212 via the via the second data path 220. In some aspects of the disclosure, the modem device 216 may transmit (e.g., via the second data path 220) one or more requests for controlling the orientation of the motorized antenna array 202 to the host processor 212. The host processor 212 may carry out the request by transmitting the appropriate control signal(s) to the base 210. In some aspects of the disclosure, the modem device 216 may transmit (e.g., via the third data path 218) the one or more control signals for controlling the orientation of the antenna panel 202 to the base 210 independent of the host processor 212. In some aspects of the disclosure, the modem device 216 may receive and/or transmit wireless communication signals via the antenna panel 202 and the third data path 218. Accordingly, the modem device 216 may process (e.g., measure, decode, etc.) wireless communication signals received at the antenna panel 202.

The BS 105 may transmit a measurement report request specifying a set of channel frequencies for the UE 200 to measure. The BS 105 may configure the set of channel frequencies by transmitting the measurement report request specifying the set of channel frequencies. In some examples, the BS 105 may transmit multiple SSBs within a time period, and each SSB may be identified by an SSB index and transmitted via a specific beam radiated in a certain direction. The UE 200, among other UEs, may perform measurements of cell quality via reference signals in the specified set of channel frequencies and may determine a signal strength of each detected SSB. From the measurements, the UE 200 may identify the SSB index with the strongest signal strength. The SSB with the strongest signal strength may be the best beam for the UE 200. The UE 200 may transmit a measurement report indicating the strongest signal strength to the BS 105.

As discussed, the antenna panel of UE 200 may be set to a plurality of antenna configurations. The UE 200 may enter an antenna configuration selection mode to select the optimal antenna configuration. For example, before the UE 200 transmits the measurement report, the UE 200 may select an optimal antenna configuration of the plurality of antenna configurations for performing the measurements and/or transmitting communication signals to the BS 105. An antenna configuration may include parameters that control or are associated with the antenna panel 202. For example, the antenna configuration may include a set of orientations (e.g., angle) of the antenna panel, a set of channel frequencies for transmitting communication signals based on the panel orientation, and the like. A main direction of each orientation may be specified by providing a three-dimensional spatial coordinate (x, y, and z coordinates) relative to other orientations of the set of orientations. In some aspects, the UE 200 may scan the channel frequencies while the antenna panel is set to each one of one or more antenna configurations of the plurality of antenna configurations and perform measurements. The UE 200 may determine a set of signal strengths for at least one beam received at each one of one or more antenna configurations of the plurality of antenna configurations for the one or more channel frequencies. In some aspects, the UE 115 may determine the set of signal strengths using a beam sweep operation (e.g., configuring the panel to step through a set of angular positions measuring signal strengths at each angular position) in the one or more frequencies for each of the one or more antenna configurations.

In some aspects of the disclosure, the UE 200 (e.g., the modem device 216) may request the antenna panel 202 to be put in different orientations and at each orientation, the modem device 216 may sweep different beams (also referred to as a beam sweep operation) and may determine a gain (e.g., a signal strength), such as a reference signal receive power (RSRP) and/or signal-to-interference-and-noise ratio (SINR) value, for that orientation. For example, the antenna panel 202 may include multiple antenna elements and, therefore, may have a set of different beams (e.g., beams oriented in different directions) which may be used for the previously described beam sweep operation. Each of the different beams may correspond to a value in a codebook. Accordingly, the modem device 216 may search the codebook to identify the different beams of the antenna panel 202 and perform the beam sweep operation. In some aspects of the disclosure, the UE 200 may repeat the beam sweep operation for different panel orientations, and the panel orientation that provides the highest gain may be chosen based on the SINR, RSRP and/or other metrics, such as spectral efficiency (SPEFF), reference signal received quality (RSRQ), and/or a relative signal strength indicator (RSSI).

The UE 200 may save the measurement results in a database and make them persistent across network connections (e.g., LTE and/or mmW connections). Based on the set of signal strengths, the UE 200 may select an optimal antenna configuration of the plurality of antenna configurations. After the optimal antenna configuration is selected, the modem device 216 may trigger movement of the antenna panel 202 to orient to a spatial direction based on the optimal antenna configuration. The UE 200 transmits communication signals (e.g., the measurement report) and/or receive communication signals in one or more channel frequencies in the list based on the optimal antenna configuration.

Changing the antenna configuration of the antenna panel of the UE 200, however, may be time consuming. The UE 200 may be unable to transmit measurement reports to the BS 105 until the optimal antenna configuration is selected.

Additionally, different BSs may have different implementations for measurement reports based on mmW measurement objects. For example, a BS may configure the set of channel frequencies (e.g., mmW channel frequencies) as soon as the UE 200 has established a connection with the network (e.g., LTE network) and entered a connected mode with the network. In another example, a BS may configure the set of channel frequencies in response to, for example, traffic load in the LTE network. The BS may expect a measurement report from the UE 200 in response to the measurement report request and may set a timer (e.g., two seconds). When the timer expires without receipt of the measurement report from the UE 200, the BS may conclude that the UE 200 was unable to perform the measurements on signals in the channel frequencies specified in the measurement report. For example, if the UE 200 has not transmitted a measurement report before the timer expires, the BS may determine that the set of channel frequencies is unavailable to the UE 200 based on the particular geographical area in which the UE 200 is located. From the perspective of the BS, rather than request the UE 200 to perform measurements while the UE 200 is not within mmW coverage, the BS may de-configure the set of channel frequencies by transmitting an instruction to the UE 200 to de-configure the set of channel frequencies. The BS may transmit a new measurement report specifying a new set of channel frequencies for the UE 200 and reset the timer. Different BSs may set their timers to different expiration times.

It may be desirable for the antenna configuration selection process to be independent from the behavior of the BS 105. For example, if the BS 105 de-configures the set of channel frequencies, it may be desirable for the UE 200 to continue to perform measurements (even for those de-configured channel frequencies) to complete the antenna configuration selection mode and select the optimal antenna configuration. Accordingly, the operation of scanning the different channel frequencies may be decoupled from the de-configuration of channel frequencies. The present disclosure provides techniques for selecting an optimal antenna configuration and communicating communication signals based on the optimal antenna configuration.

Figure 3:
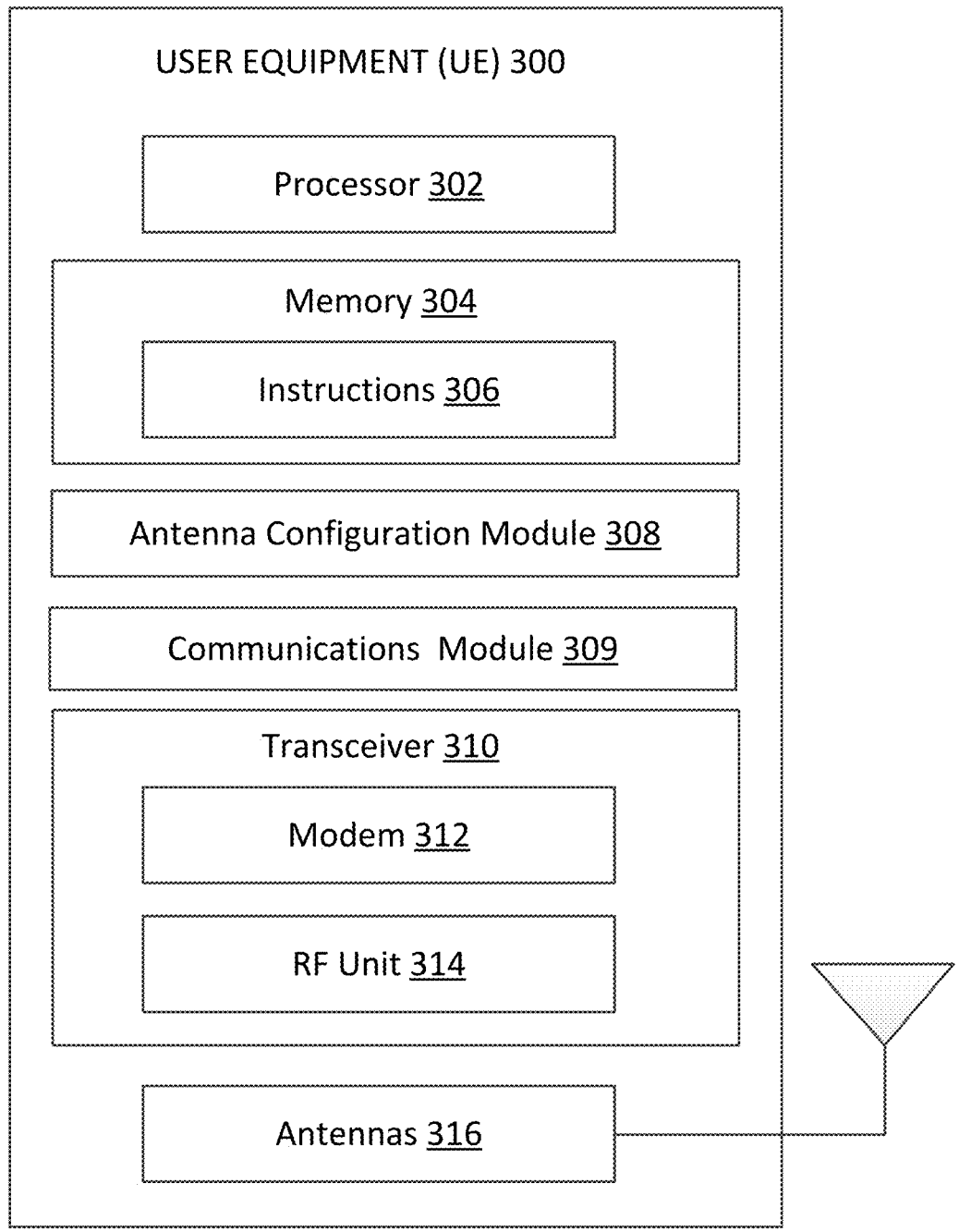
FIG. 3 illustrates a block diagram of a UE in accordance with one or more aspects of the present disclosure.

FIG. 3 illustrates a block diagram of a UE 300 in accordance with one or more aspects of the present disclosure. The UE 300 may be a UE 115 discussed above in FIG. 1 and/or a UE 200 discussed above in FIG. 2. As shown, the UE 300 may include a processor 302, a memory 304, an antenna configuration module 308, a communications module 309, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 304 includes a non-transitory computer-readable medium. The memory 304 may store, or have recorded thereon, instructions 306. The instructions 306 may include instructions that, when executed by the processor 302, cause the processor 302 to perform the operations described herein with reference to the UEs in connection with aspects of the present disclosure, for example, aspects of FIGS. 1, 2, and 5-8. Instructions 306 may also be referred to as program code. The program code may be for causing a wireless communication device to perform these operations, for example, by causing one or more processors (such as processor 302) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The antenna configuration module 308 and/or the communications module 309 may be implemented via hardware, software, or combinations thereof. The antenna configuration module 308 and/or the communications module 309 may be implemented as a processor, circuit, and/or instructions 306 stored in the memory 304 and executed by the processor 302. In some instances, the antenna configuration module 308 and/or the communications module 309 can be integrated within the modem subsystem 312. The antenna configuration module 308 and/or the communications module 309 can be implemented by a combination of software components (e.g., executed by a DSP or a general processor) and hardware components (e.g., logic gates and circuitry) within the modem subsystem 312. The antenna configuration module 308 and/or the communications module 309 may be used for various aspects of the present disclosure, for example, aspects of FIGS. 1, 2, and 5-8.

In some aspects, the antenna configuration module 308 may be configured to determine a plurality of antenna configurations for a list of channel frequencies, the list of channel frequencies being stored in a database at the UE. The antenna configuration module 308 may configured to determine a set of signal strengths for at least one beam received at each one of one or more antenna configurations of the plurality of antenna configurations for one or more channel frequencies in the list. The antenna configuration module 308 may configured to select, based on the set of signal strengths, a first antenna configuration of the plurality of antenna configurations stored in the database. In some aspects, the communications module 309 may be configured to communicate with a BS (e.g., BS 105), communication signals in one or more channel frequencies in the list based on the first antenna configuration.

As shown, the transceiver 310 may include the modem subsystem 312 and the RF unit 314. The transceiver 310 can be configured to communicate bi-directionally with other devices, such as the BSs 105 or BS 400. The modem subsystem 312 may be configured to modulate and/or encode the data from the memory 304, the antenna configuration module 308, and/or the communications module 309 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data (e.g., measurement report, measurement of signals in one or more channel frequencies, etc.) from the modem subsystem 312 (on outbound transmissions) or of transmissions originating from another source such as a UE 115, 200 or a BS 105, 400. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The transceiver 310 may provide the demodulated and decoded data (e.g., RRC configurations, SSBs, SIBs, RMSIs, reference signals, list of channel frequencies, measurement report request, instruction to de-configure one or more channel frequencies, etc.) to the antenna configuration module 308 and/or the communications module 309 for processing. The antennas 316 may include multiple antennas of similar or different designs to sustain multiple transmission links. For example, the antennas 316 may correspond to antennas in the antenna panel 202 in FIG. 2. The RF unit 314 may configure the antennas 316.

In some aspects, the transceiver 310 may coordinate with the antenna configuration module 308 to receive a measurement report request specifying a set of channel frequencies, transmit a measurement report, and/or receive a set of signals for measuring. In some aspects, the transceiver 310 may coordinate with the communications module 309 to communicate (e.g., receive or transmit) communication signals in one or more channel frequencies in the list based on one or more antenna configurations.

In some aspects, the UE 300 can include multiple transceivers 310 implementing different radio access technologies (RATs) (e.g., NR and LTE). In an aspect, the UE 300 can include a single transceiver 310 implementing multiple RATs (e.g., NR and LTE). In an aspect, the transceiver 310 can include various components, where different combinations of components can implement different RATs.

Figure 4:
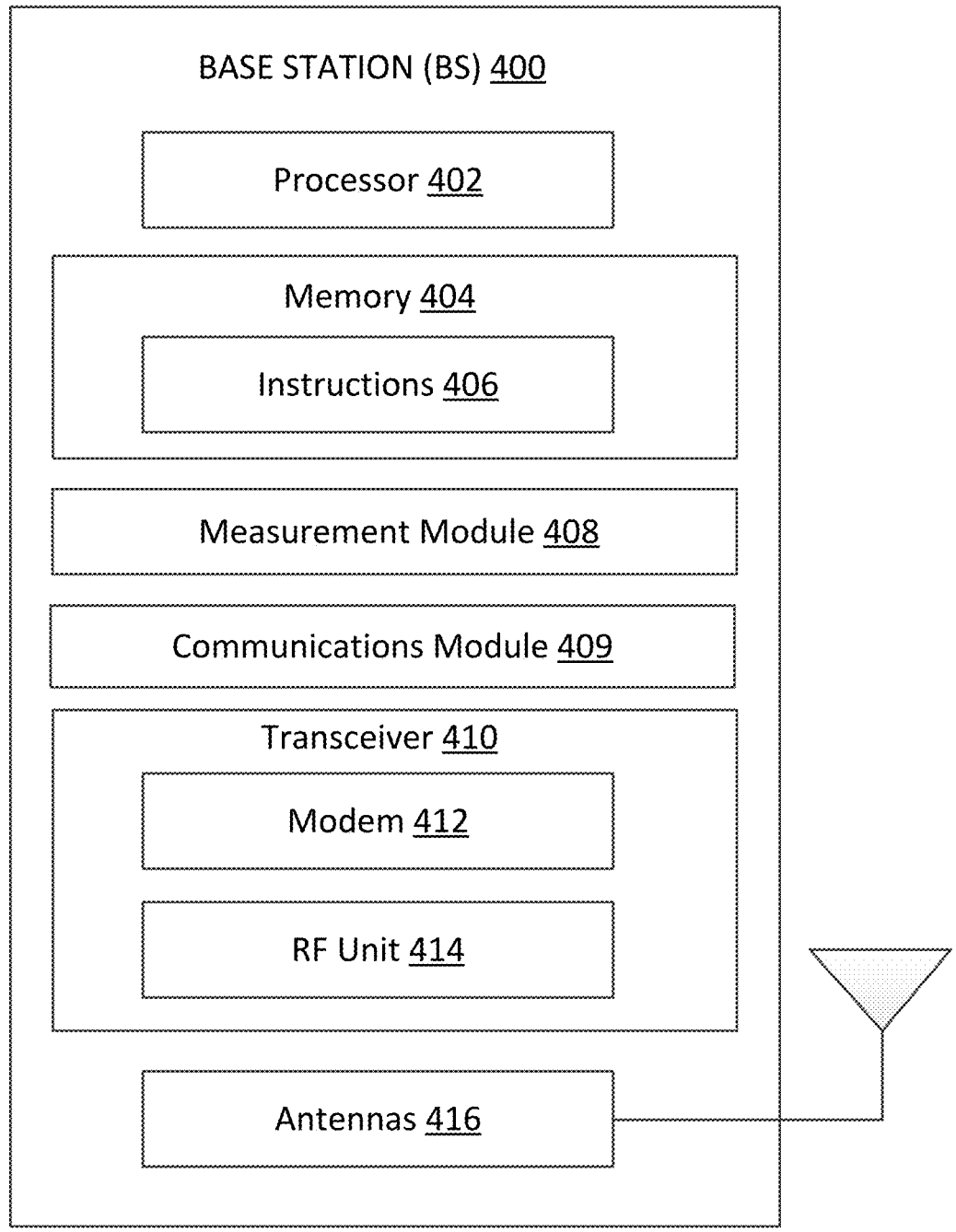
FIG. 4 illustrates a block diagram of a base station (BS) in accordance with one or more aspects of the present disclosure.

FIG. 4 illustrates a block diagram of a BS 400 in accordance with one or more aspects of the present disclosure. The BS 400 may be a BS 105 as discussed above in FIG. 1. As shown, the BS 400 may include a processor 402, a memory 404, a measurement module 408, a communications module 409, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 404 may include a non-transitory computer-readable medium. The memory 404 may store instructions 406. The instructions 406 may include instructions that, when executed by the processor 402, cause the processor 402 to perform operations described herein, for example, aspects of FIGS. 1, 2, 5-8. Instructions 406 may also be referred to as code, which may be interpreted broadly to include any type of computer-readable statement(s) as discussed above with respect to FIG. 3.

The measurement module 408 and/or the communications module 409 may be implemented via hardware, software, or combinations thereof. The measurement module 408 and/or the communications module 409 may be implemented as a processor, circuit, and/or instructions 406 stored in the memory 404 and executed by the processor 402. In some instances, the measurement module 408 and/or the communications module 409 can be integrated within the modem subsystem 412. The measurement module 408 and/or the communications module 409 can be implemented by a combination of software components (e.g., executed by a DSP or a general processor) and hardware components (e.g., logic gates and circuitry) within the modem subsystem 412. The measurement module 408 and/or the communications module 409 may be used for various aspects of the present disclosure, for example, aspects of FIGS. 1, 2, 5-8.

In some aspects, the measurement module 408 may be configured to transmit to a UE, a measurement report request specifying a set of channel frequencies. The set of channel frequencies may include mmW channel frequencies. The measurement module 408 may be configured to start a timer after transmitting the measurement report request and determine whether a measurement report is received from the UE before the timer expires. If the timer expires before the measurement module 408 receives a measurement report from the UE, the BS 105 may determine that the set of channel frequencies specified in the measurement report request is unavailable to the UE. The measurement module 408 may be configured to transmit an instruction to de-configure a channel frequency of the set of channel frequencies. The communications module 409 may be configured to transmit to the UE, one or more signals (e.g., SSBs, reference signals) in the set of channel frequencies for measurement by the UE.

As shown, the transceiver 410 may include the modem subsystem 412 and the RF unit 414. The transceiver 410 can be configured to communicate bi-directionally with other devices, such as the UEs (e.g., UE 115, UE 200, and/or UE 300), a BS (e.g., BS 105), and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., RRC configurations, SSBs, list of channel frequencies, reference signals, measurement report request, instruction to de-configure one or more channel frequencies etc.) from the modem subsystem 412 (on outbound transmissions) or of transmissions originating from another source such as a UE 115, 200, or 300. The RF unit 414 may be further configured to perform analog beamforming in conjunction with the digital beamforming. Although shown as integrated together in transceiver 410, the modem subsystem 412 and/or the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of information to complete attachment to a network and communication with a camped UE 115, UE 200, or UE 300 according to some aspects of the present disclosure. The antennas 416 may further receive data messages transmitted from other devices and provide the received data messages for processing and/or demodulation at the transceiver 410. The transceiver 410 may provide the demodulated and decoded data (e.g., measurement report, measurement of signals in one or more channel frequencies, etc.) to the measurement module 408 and/or the communications module 409 for processing. The antennas 416 may include multiple antennas of similar or different designs in order to sustain multiple transmission links.

In some aspects, the transceiver 410 may coordinate with the measurement module 408 and/or the communications module 409 to transmit a measurement report request, to transmit one or more signals in one or more channel frequencies for measurement by the UE, and/or the receive communication signals in one or more channel frequencies based on a given antenna configuration.

In some aspects, the BS 400 can include multiple transceivers 410 implementing different RATs (e.g., NR and LTE). In an aspect, the BS 400 can include a single transceiver 410 implementing multiple RATs (e.g., NR and LTE). In an aspect, the transceiver 410 can include various components, where different combinations of components can implement different RATs.

Figure 5:
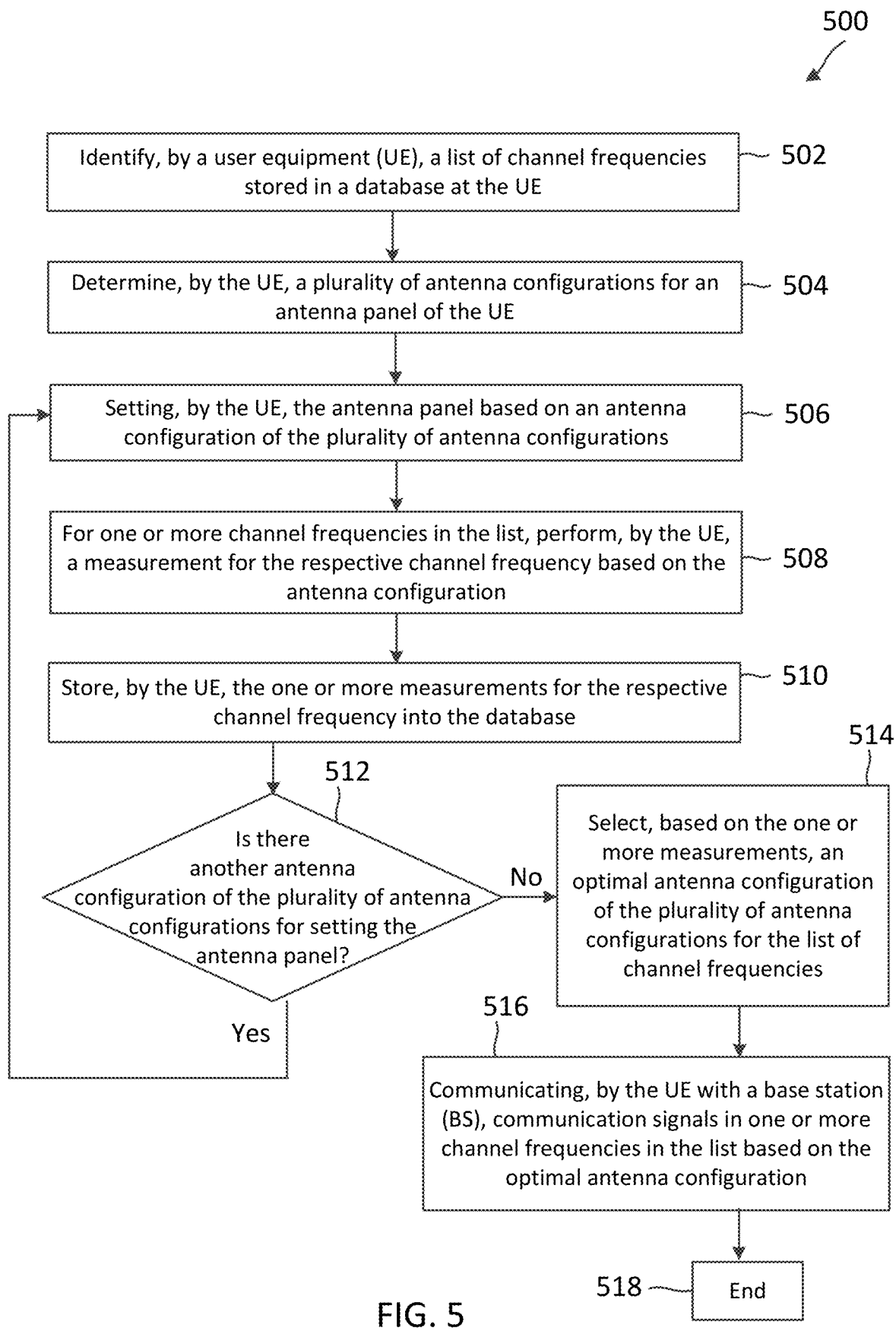
FIG. 5 illustrates a flow diagram of a communication method for storing measurements into a database in accordance with one or more aspects of the present disclosure.

FIG. 5 illustrates a flow diagram of a communication method 500 for storing measurements into a database in accordance with one or more aspects of the present disclosure. Blocks of the method 500 can be executed by a computing device (e.g., a processor, processing circuit, and/or other suitable component) of a wireless communication device. In some aspects, the wireless communication device is a UE (e.g., UE 115, UE 200, and/or UE 300) that may utilize one or more components, such as the processor 302, the memory 304, the antenna configuration module 308, the communications module 309, the transceiver 310, and/or the antennas 316 in FIG. 3 and/or the antenna panel 202, the host processor 212, and/or a modem device 216 in FIG. 2 to execute the blocks of the method 500. The method 500 may employ similar aspects as in the method 600 in FIG. 6, the method 700 in FIG. 7, and/or the method of 800 in FIG. 8. As illustrated, the method 500 includes a number of enumerated blocks, but aspects of the method 500 may include additional blocks before, after, and/or in between the enumerated blocks. In some aspects, one or more of the enumerated blocks may be omitted or performed in a different order.

At block 502, the method 500 includes identifying, by a UE 115, a list of channel frequencies stored in a database at the UE 115. The channel frequencies may be mmW channel frequencies. The UE 115 may store the list of channel frequencies at, for example, the memory 304 in FIG. 3. The UE 115 may collect the list of channel frequencies over a period of time. In some aspects, at least one channel frequency in the list of channel frequencies is preconfigured. For example, an original equipment manufacturer (OEM) of the UE may preconfigure at least one channel frequency in the list. In some aspects, the UE 115 may receive a measurement report request from the BS 105. The measurement report request may specify a set of channel frequencies for measurement by the UE 115 and may provide the UE 115 with information regarding channel frequencies that are of interest based on the geographical location of the UE 115. The UE 115 may insert the set of channel frequencies into the list of channel frequencies stored in the database. Accordingly, the database may store a list of channel frequencies that are preconfigured and/or indicated by the BS 105 as being of interest to the UE 115 (e.g., via a measurement report request).

At block 504, the method 500 includes determining, by the UE 115, a plurality of antenna configurations for an antenna panel of the UE 115. The antenna panel of the UE 115 may correspond to the antenna panel 202 in FIG. 2. The antenna panel may be, for example, a motorized rotatable antenna panel, a multi-panel, or a single-panel. An antenna configuration may include parameters that control or are associated with the antenna panel. the antenna configuration may include a set of orientations (e.g., angle) of the antenna panel, a set of channel frequencies for transmitting communication signals based on the panel orientation, and the like.

The UE 115 may enter and exit an antenna configuration selection mode. In some aspects, while the UE 115 is in the antenna configuration selection mode, the UE 115 may execute the blocks 506, 508, 510, 512, and/or 514 in FIG. 5. A discussion of a first trigger for entering and a second trigger for exiting the antenna configuration selection mode may be found in relation to, for example, aspects of FIG. 7.

At block 506, the method 500 includes setting, by the UE 115, the antenna panel based on an antenna configuration of the plurality of antenna configurations. The UE 115 may set the antenna panel of the UE to orient to a spatial direction based on the antenna configuration to communicate one or more communication signals in one or more channel frequencies.

At block 508, the method 500 includes for one or more channel frequencies in the list, performing, by the UE 115, a measurement for the respective channel frequency based on the antenna configuration. In some aspects, the UE 115 may determine, based on the one or more measurements, a set of signal strengths for at least one beam received at the antenna panel of the UE 115. The UE 115 may determine the set of signal strengths using a beam sweep operation in one or more channel frequencies based on the antenna configuration at which the antenna panel is set. The set of signal strengths may be based on at least one of a SINR measurement, an RSRP measurement, an RSSI, an RSRQ, or an SPEFF measurement, or combinations thereof, in the respective channel frequency.

In some aspects, the UE 115 may establish with the BS, a connection to an LTE network. Upon establishing the connection, the UE 115 may enter a connected mode in the LTE network. To save power, the UE 115 may enter an idle mode and may switch between the connected mode and the idle mode. While the UE 115 is the idle mode, the UE 115 may perform one or more measurements for the respective channel frequency based on the antenna configuration.

In some aspects, the UE 115 may establish with the BS, a connection to an NR network. Upon establishing the connection, the UE 115 may enter a connected mode in the NR network. While the UE 115 is connected to the NR network, the UE 115 may enter a connected mode discontinuous reception (CDRX) power off mode, which may allow the UE 115 to make signaling-free transitions between sleep and wake states. While the UE is in the CDRX power off mode, the UE 115 may perform one or more measurements for the respective channel frequency based on the antenna configuration.

At block 510, the method 500 includes storing, by the UE 115, the one or more measurements for the respective channel frequency into the database. In some aspects, the UE 115 may store the set of signal strengths into the database. Accordingly, the database may store a signal strength for at least one beam received at the antenna configuration for the respective channel frequencies. The UE 115 may reference the signal strength information stored in the database in the future.

At block 512, the method 500 includes determining whether there is another antenna configuration of the plurality of antenna configurations for setting the antenna panel. If there is another antenna configuration of the plurality of antenna configurations to process, the method 500 may proceed back to block 506, in which the UE 115 sets the antenna panel based on another antenna configuration of the plurality of antenna configurations as discussed relative to FIG. 2 and/or FIG. 3.

In contrast, if there is not another antenna configuration of the plurality of antenna configurations to process, the method 500 may proceed to block 514. At block 514, the method 500 includes selecting, based on the one or more measurements, an optimal antenna configuration of the plurality of antenna configurations for the list of channel frequencies. The UE 115 may select, based on different statistics of measurements across different channel frequencies and antenna configurations, the optimal antenna configuration for the list of channel frequencies. The optimal antenna configuration may be used across channel frequencies in the list.

In some examples, for one or more channel frequencies in the list of channel frequencies, the UE 115 may determine a given antenna configuration of the plurality of antenna configurations providing a highest signal strength for the respective channel frequency. The UE 115 may store an association between the given antenna configuration and the respective channel frequency in the database, where the association indicates that the given antenna configuration is an optimal antenna configuration for the respective channel frequency. Accordingly, the database may store the optimal antenna configuration for a particular channel frequency.

For example, a first channel frequency may be associated with a first antenna configuration in the database (indicating that the first antenna configuration is an optimal antenna configuration for the first channel frequency) and may be different from the optimal antenna configuration for the list of channel frequencies. It may be time consuming for the UE 115 to determine a given channel frequency for each transmission and then set the antenna panel of the UE 115 to the optimal antenna configuration for the given channel frequency for the transmission. In some aspects, the UE 115 may select an optimal antenna configuration for the list of channel frequencies such that the UE 115 communicates communication signals in one or more channel frequencies in the list based on the optimal antenna configuration.

In some examples, the UE 115 may select the optimal antenna configuration for the list of channel frequencies, where the optimal antenna configuration has a greatest number of highest signal strengths above a threshold for the list of channel frequencies. In some examples, the UE 115 may select the optimal antenna configuration for the list of channel frequencies, where the optimal antenna configuration has a highest signal strength of the set of signal strengths. In some examples, the UE 115 may select the optimal antenna configuration for the list of channel frequencies, where the optimal antenna configuration has a set of signal strengths above a threshold for each of the one or more channel frequencies in the list. These examples are not intended to be limiting, and other example techniques for selecting the optimal antenna configurations are within the scope of the present disclosure.

At block 516, the method 500 includes communicating, by the UE 115 with a BS 105, communication signals in one or more channel frequencies in the list based on the optimal antenna configuration. For example, the UE 115 may set an antenna panel of the UE to orient to a spatial direction based on the optimal antenna configuration and communicate communication signals based on the optimal antenna configuration. At block 518, the method 500 ends.

While the UE 115 executes blocks 506, 508, 510, and/or 512, for example, the BS 105 may transmit an instruction to de-configure a channel frequency in the list of channel frequencies. The UE 115 may continue to execute the blocks 506, 508, 510, and/or 512, notwithstanding the instruction.

The UE 115 may execute the method 500 based on various mechanisms. For example, the UE 115 may execute the method 500 periodically (e.g., every week), based on a client request, or the like.

Figure 6:
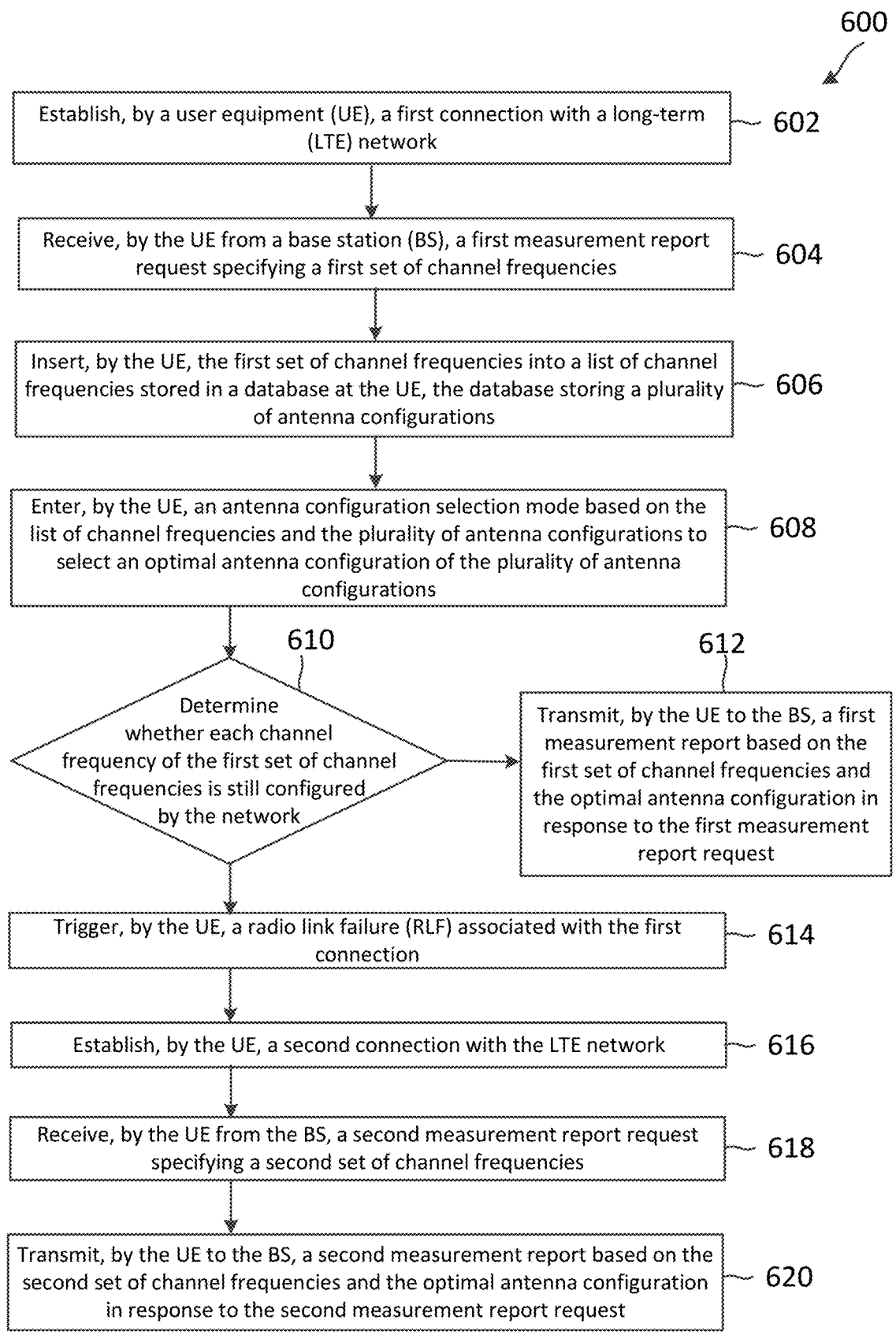
FIG. 6 illustrates a flow diagram of a communication method for establishing a connection to a network and handling a de-configuration instruction in accordance with one or more aspects of the present disclosure.

FIG. 6 illustrates a flow diagram of a communication method 600 for establishing a connection to a network and handling a de-configuration instruction in accordance with one or more aspects of the present disclosure. Blocks of the method 600 can be executed by a computing device (e.g., a processor, processing circuit, and/or other suitable component) of a wireless communication device. In some aspects, the wireless communication device is a UE (e.g., UEs 115 and/or UE 300) that may utilize one or more components, such as the processor 302, the memory 304, the antenna configuration module 308, the communications module 309, the transceiver 310, and/or the antennas 316 to execute the blocks of the method 600. The method 600 may employ similar aspects as in the method 500 in FIG. 5, the method 700 in FIG. 7, and/or the method of 800 in FIG. 8. As illustrated, the method 600 includes a number of enumerated blocks, but aspects of the method 600 may include additional blocks before, after, and/or in between the enumerated blocks. In some aspects, one or more of the enumerated blocks may be omitted or performed in a different order.

At block 602, the method 600 includes establishing, by a UE 115, a first connection with an LTE network. After establishing the first connection with the LTE network, the UE 115 may be in a connected mode associated with the LTE network.

At block 604, the method 600 includes receiving, by the UE 115 from a BS 105, a first measurement report request specifying a first set of channel frequencies. The first set of channel frequencies may include mmW channel frequencies. The BS 105 may transmit the first measurement report request to the UE 115 based on a trigger. For example, the trigger may be detection by the BS 105 that the UE 115 has established a connection with the LTE network (e.g., the UE 115 is in the connected mode associated with the LTE network).

At block 606, the method 600 includes inserting, by the UE 115, the first set of channel frequencies into a list of channel frequencies stored in a database at the UE 115, the database storing a plurality of antenna configurations. The plurality of antenna configurations may include, for example, an orientation of the antenna panel (e.g., angles) in which the antenna panel may be set. The database may include a set of preconfigured channel frequencies (e.g., preconfigured by the OEM of the UE 115) and/or the first set of channel frequencies. Additionally, after establishing the first connection, the BS 105 may transmit new channel frequencies to the UE 115, and the UE 115 may insert the new channel frequencies into the database.

At block 608, the method 600 includes entering, by the UE 115, an antenna configuration selection mode based on the list of channel frequencies and the plurality of antenna configurations to select an optimal antenna configuration of the plurality of antenna configurations. In some aspects, while the UE 115 in the antenna configuration selection mode of block 608, the UE 115 may execute the blocks 506, 508, 510, 512, and/or 514 in FIG. 5.

While the UE 115 is in the antenna configuration selection mode, the BS 105 may de-configure one or more channel frequencies specified in the first measurement report. A modem device (e.g., modem device 216 in FIG. 2) may have an LTE portion (e.g., in hardware and/or software) that is associated with the LTE network (e.g., implementing LTE operations) and an NR portion (e.g., in hardware and/or software) that is associated with the NR network (e.g., implementing NR operations). In some aspects, after the BS 105 has de-configured all channel frequencies, the NR portion of the modem device may still be active. For example, the NR portion of the modem device may continue to transmit commands that control the rotation of the antenna panel 202 for performing the measurements.

At block 610, the method 600 includes determining whether each channel frequency of the first set of channel frequencies is still configured by the network. If so, the method 600 may proceed to block 612. At block 612, the method 600 includes transmitting, by the UE 115 to the BS 105, a first measurement report based on the first set of channel frequencies and the optimal antenna configuration in response to the first measurement report request. Each channel frequency of the first set of channel frequencies may still be configured within the first connection (e.g., LTE network), if for example, the BS 105 maintains the measurement objects associated with the measurement report request, the BS 105 reconfigures the measurement objects associated with the measurement report request within the first connection, or the like. Additionally or alternatively, while the UE 115 is in the antenna configuration selection mode, the UE 115 may keep the first set of channel frequencies configured within the first connection by transmitting one or more measurement reports to the BS 105. The BS 105 may receive the one or more measurement reports and determine to not de-configure the channel frequencies specified in the one or more measurement reports.

In contrast, if a channel frequency of the first set of channel frequencies is not configured by the network, the method 600 may proceed back to block 614. If the UE 115 received an instruction to de-configure a channel frequency of the first set of channel frequencies, the UE 115 may determine that the channel frequency is not configured within the first connection. For example, after receiving the instruction to de-configure one or more channel frequencies, the UE 115 may perform a measurement for a de-configured channel frequency based on an antenna configuration of the plurality of antenna configurations and determine one or more signal strengths for at least one beam received at the antenna configuration for the de-configured channel frequency.

At block 614, the method 600 includes triggering, by the UE 115, a radio link failure (RLF) associated with the first connection. The UE 115 may set the antenna panel of the UE 115 based on the optimal antenna configuration and may trigger the RLF after setting the antenna panel. After the RLF, the UE 115 may no longer be connected to the LTE network. Accordingly, the UE 115 may be ready to transmit communication signals based on the optimal antenna configuration.

At block 616, the method 600 includes establishing, by the UE, a second connection with the LTE network. After establishing the second connection with the LTE network, the UE 115 may be in a connected mode associated with the LTE network.

At block 618, the method 600 includes receiving, by the UE 115 from the BS 105, a second measurement report request specifying a second set of channel frequencies. The second set of channel frequencies may include mmW channel frequencies. The BS 105 may transmit the second measurement report request to the UE 115 based on a trigger. For example, the trigger may be detection by the BS 105 that the UE 115 has established a connection with the LTE network (e.g., the UE 115 is in the connected mode associated with the LTE network). The UE 115 may perform a set of measurements for each one of the one or more channel frequencies based on the optimal antenna configuration.

At block 620, the method 600 includes transmitting, by the UE 115 to the BS 105, a second measurement report based on the second set of channel frequencies and the optimal antenna configuration in response to the second measurement report request. The second measurement report may be based on the set of measurements. The antenna panel of the UE 115 may be oriented to a spatial direction based on the optimal antenna configuration and the UE 115 may transmit the second measurement report.

The UE 115 may execute the method 600 based on various mechanisms. For example, the UE 115 may execute the method 600 periodically (e.g., every week), based on a client request, or the like.

Figure 7:
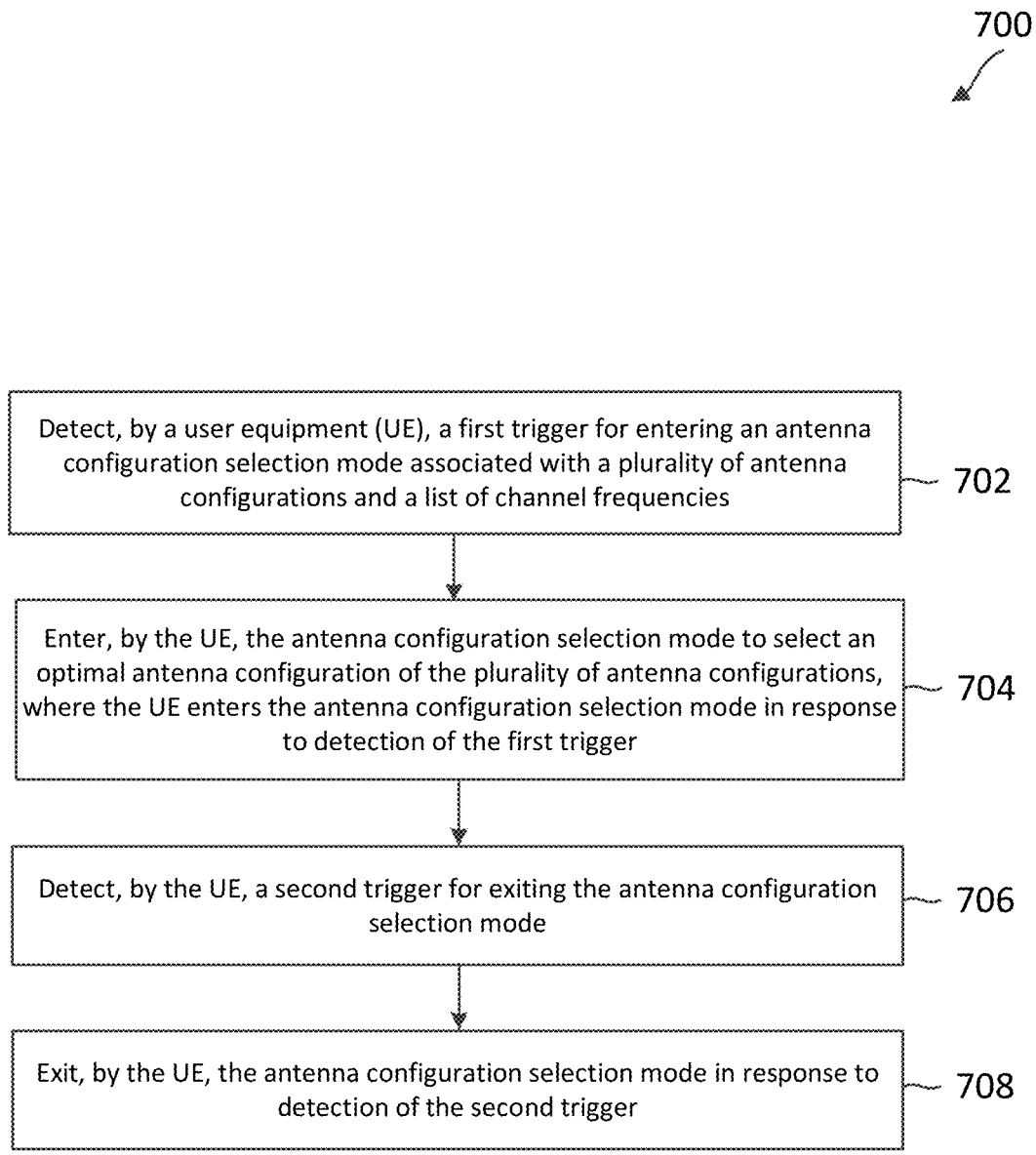
FIG. 7 illustrates a flow diagram of a communication method for entering and exiting an antenna configuration selection mode in accordance with one or more aspects of the present disclosure.

The UE 115 may enter and or exit the antenna configuration selection mode based on various mechanisms. FIG. 7 illustrates a flow diagram of a communication method 700 for entering and exiting an antenna configuration selection mode in accordance with one or more aspects of the present disclosure. Blocks of the method 700 can be executed by a computing device (e.g., a processor, processing circuit, and/or other suitable component) of a wireless communication device. In some aspects, the wireless communication device is a UE (e.g., UEs 115 and/or UE 300) that may utilize one or more components, such as the processor 302, the memory 304, the antenna configuration module 308, the communications module 309, the transceiver 310, and/or the antennas 316 to execute the blocks of the method 700. The method 700 may employ similar aspects as in the method 500 in FIG. 5, the method 600 in FIG. 6, and/or the method of 800 in FIG. 8. As illustrated, the method 700 includes a number of enumerated blocks, but aspects of the method 700 may include additional blocks before, after, and/or in between the enumerated blocks. In some aspects, one or more of the enumerated blocks may be omitted or performed in a different order.

At block 702, the method 700 includes detecting, by a UE 115, a first trigger for entering an antenna configuration selection mode associated with a plurality of antenna configurations and a list of channel frequencies. The first trigger may include, for example, at least one of an initial installation of the UE 115, an output signal from a motion sensor included in the UE 115, an activation of a physical button on the UE 115, an activation of a touchscreen button displayed on a display coupled to the UE 115, an expiration of a recurring timer (e.g., a timer set by the BS 105 for receiving the measurement report), a start of a new power cycle at the UE 115, an insertion of a channel frequency into the database, a threshold number of RLFs at the UE 115, or combinations thereof. If the UE 115 experiences at least the threshold number of RLFs, then the current antenna configuration may be sub-optimal and it may be desirable to determine a new optimal antenna configuration and accordingly enter the antenna configuration selection mode.

In some examples, the UE 115 may detect the first trigger in response to, for example, receiving a measurement report request from the BS 105, establishing a connection to the LTE network, or combinations thereof. In some examples, the UE 115 may be a mobile device having an application that when invoked triggers the UE 115 to enter the antenna configuration selection mode. The application may be installed on the mobile device by the OEM or may be downloaded onto the mobile device by a user.

At block 704, the method 700 includes entering, by the UE 115, the antenna configuration selection mode to select an optimal antenna configuration of the plurality of antenna configurations, where the UE enters the antenna configuration selection mode in response to detection of the first trigger. In some aspects, while in the antenna configuration selection mode, the UE 115 may determine a set of signal strengths for at least one beam received at each one of one or more antenna configurations of the plurality of antenna configurations for one or more channel frequencies in a list of channel frequencies and may store the set of signal strengths into the database. The UE 115 may delete the set of signal strengths from the database in response to detecting the first trigger. In some aspects, while the UE 115 is in a connected mode in a network (e.g., LTE network), the UE 115 may receive from the BS 105, a measurement report request specifying a channel frequency (e.g., mmW channel frequencies) and may enter the antenna configuration selection mode in response to receiving the measurement report request.

At block 706, the method 700 includes detecting, by the UE 115, a second trigger for exiting the antenna configuration selection mode. The second trigger may include, for example, determining that each signal strength based on the respective antenna configuration for the one or more channel frequencies in the list is greater than a signal quality threshold. In this example, the respective antenna configuration may provide very strong signal strengths for the one or more channel frequencies, and the UE 115 may determine that the antenna configuration is an optimal antenna configuration for the list of channel frequencies.

At block 708, the method 700 includes exiting, by the UE 115, the antenna configuration selection mode in response to detection of the second trigger. For example, the UE 115 may exit the antenna configuration selection mode in response to determining that each signal strength based on the respective antenna configuration for the one or more channel frequencies in the list is greater than the signal quality threshold.

The UE 115 may receive an indication of a channel frequency to insert into the list before or after the UE 115 enters or exits the antenna configuration selection mode. In some aspects, if the UE 115 receives the indication of the channel frequency to insert into the list before or after the UE 115 enters the antenna configuration selection mode or before or after the UE 115 exits the antenna configuration selection mode, the UE 115 may insert the indicated channel frequency into the list and perform measurements for the indicated channel frequency based on each one of one or more antenna configurations of the plurality of antenna configurations.

In some aspects, if the UE 115 receives the indication of the channel frequency to insert into the list after the UE 115 enters the antenna configuration selection mode, the UE 115 may insert the indicated channel frequency into the list, without performing measurements for the indicated channel frequency while the UE 115 is in the current antenna configuration selection mode. The next time the UE 115 enters the antenna configuration selection mode, the UE 115 may perform measurements for the indicated channel frequency based on each one of one or more antenna configurations of the plurality of antenna configurations. In some aspects, if the UE 115 receives the indication of the channel frequency to insert into the list after the UE 115 exits the antenna configuration selection mode, the insertion of the indicated channel frequency may be an example of the first trigger for entering the antenna configuration selection mode.

Figure 8:
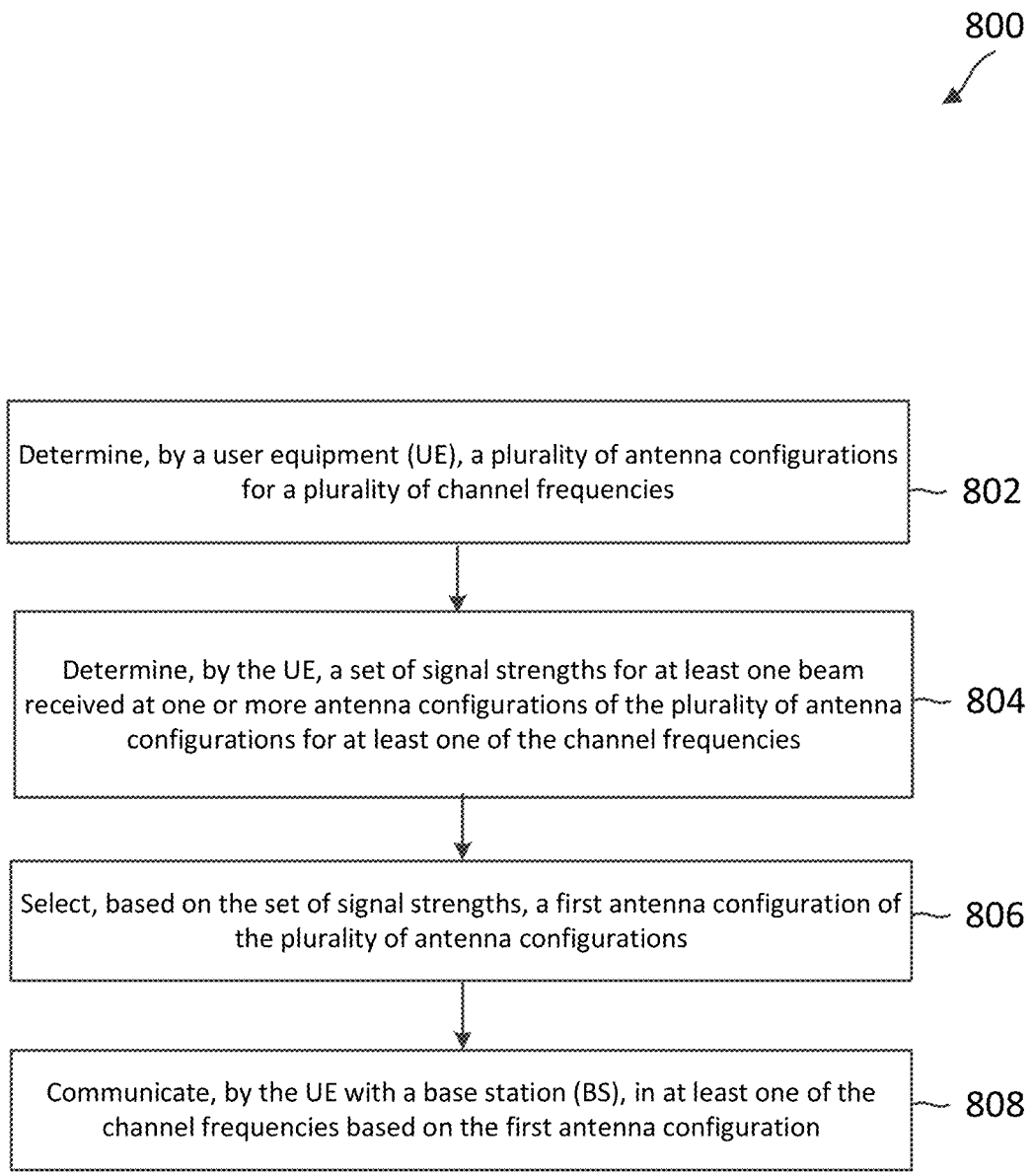
FIG. 8 illustrates a flow diagram of a communication method for communicating communication signals based on an optimal antenna configuration in accordance with one or more aspects of the present disclosure.

FIG. 8 illustrates a flow diagram of a communication method 800 for communicating communication signals based on an optimal antenna configuration in accordance with one or more aspects of the present disclosure. Blocks of the method 800 can be executed by a computing device (e.g., a processor, processing circuit, and/or other suitable component) of a wireless communication device. In some aspects, the wireless communication device is a UE (e.g., UEs 115 and/or UE 300) that may utilize one or more components, such as the processor 302, the memory 304, the antenna configuration module 308, the communications module 309, the transceiver 310, and/or the antennas 316 to execute the blocks of the method 800. The method 800 may employ similar aspects as in the method 500 in FIG. 5, the method 600 in FIG. 6, and/or the method of 700 in FIG. 7. As illustrated, the method 800 includes a number of enumerated blocks, but aspects of the method 800 may include additional blocks before, after, and/or in between the enumerated blocks. In some aspects, one or more of the enumerated blocks may be omitted or performed in a different order.

At block 802, the method 800 includes determining, by a UE 115, a plurality of antenna configurations for a plurality of channel frequencies. The plurality of channel frequencies may be included in a list of channel frequencies stored in a database at the UE. The list of channel frequencies may include zero or more preconfigured channel frequencies (e.g., by an OEM of the UE 115) and zero or more channel frequencies specified in a measurement report request from a BS. The UE 115 may insert the specified channel frequencies into the list of channel frequencies stored in the database. The UE 115 may modify the list of channel frequencies stored at the database, with the insertion of additional channel frequencies to the list and/or the removal of channel frequencies from the list.

In some aspects, the UE 115 may establish with the BS, a connection to an LTE network. The UE 115 may enter an idle mode. While the UE 115 is the idle mode, the UE 115 may perform a set of measurements for each one of the one or more channel frequencies of the plurality of channel frequencies based on the first antenna configuration. In some aspects, the UE 115 may establish with the BS, a connection to an NR network and may enter, while the UE is connected to the NR network, CDRX power off mode. While the UE is in the CDRX power off mode, the UE 115 may perform a set of measurements for each one of the one or more channel frequencies in the list based on the first antenna configuration.

The UE 115 may enter an antenna configuration selection mode. While the UE 115 is in the antenna configuration selection mode, the UE 115 may execute the blocks 804 and 806. At block 804, the method 800 includes determining, by the UE 115, a set of signal strengths for at least one beam received at one or more antenna configurations of the plurality of antenna configurations for at least one of the channel frequencies. The UE 115 may determine the set of signal strengths using a beam sweep operation in the one or more frequencies for each of the one or more antenna configurations.

In some aspects, the UE 115 may determine the set of signal strengths by, for example, setting an antenna panel of the UE to orient to a first spatial direction based on each one of one or more antenna configurations of the plurality of antenna configurations and scanning each one of the one or more channel frequencies in the list based on the each one of the one or more antenna configurations. If the antenna panel is a motorized rotatable antenna panel, the UE may determine the set of signal strengths for at least one beam received at the motorized rotatable antenna panel of the UE. If the antenna panel is a multi-panel, the UE may determine the set of signal strengths for at least one beam received at the multi-panel of the UE. Each of the set of signal strengths may be based on at least one of an SINR measurement, an RSRP measurement, an RSSI, an RSRQ, or an SPEFF measurement, or combinations thereof, in the respective channel frequency.

In some aspects, for one or more channel frequencies in the list of channel frequencies, the UE 115 may determine a given antenna configuration of the plurality of antenna configurations providing a highest signal strength for the respective channel frequency and may store an association between the given antenna configuration and the respective channel frequency in the database. The association between the given antenna configuration and the respective channel frequency may indicate that the given antenna configuration provides a highest signal strength relative to other signal strengths associated with other antenna configurations for the respective channel frequency.

If the UE 115 receives an instruction to de-configure a channel frequency of the set of channel frequencies from the BS 105, the UE 115 may continue to determine the set of signal strength for at least one beam received at the first antenna configuration for the de-configured channel frequency.

At block 806, the method 800 includes selecting, based on the set of signal strengths, a first antenna configuration of the plurality of antenna configurations. The UE 115 may select the first antenna configuration based on different statistics of measurements across different channel frequencies and antenna configurations. In some aspects, the UE 115 may select a particular antenna configuration for each channel frequency and then determine the optimal antenna configuration for all channel frequencies in the list of channel frequencies. The UE 115 may store an association between the particular antenna configuration and the corresponding channel frequency. Accordingly, the UE 115 may reference this information at a later point in time. For example, at a later point in time, the UE 115 may determine to scan a subset of channel frequencies in the list of channel frequencies rather than performing a full scan of the list of channel frequencies. The UE 115 may select, for example, the particular antenna configuration corresponding to each of the channel frequencies of the subset and select an optimal antenna configuration associated with a highest signal strength.

In some aspects—the UE 115 may select the first antenna configuration having a greatest number of highest signal strengths above a threshold for the list of channel frequencies. In some aspects—the UE 115 may select the first antenna configuration having a highest signal strength of the set of signal strengths. In some aspects, the UE 115 may select the first antenna configuration having a signal strength of the set of signal strengths above a threshold for each of the one or more channel frequencies in the list. In some aspects, the UE 115 determine the set of signal strengths for at least one beam received at each one of one or more antenna configurations of the plurality of antenna configurations for a single channel frequency. The UE 115 may select an optimal antenna configuration providing a highest signal strength for the single channel frequency.

Although the disclosure may describe the UE as including a motorized rotatable antenna panel, it should be understood that the disclosure may apply to other scenarios (e.g., multi-panel) in which the UE 115 performs measurements for selecting an optimal antenna configuration. In some aspects, if the multi-panel includes multiple fixed panels, a first set of signal strengths may be associated with a first fixed panel and a second set of signal strengths may be associated with a second fixed panel. The UE select the antenna configuration (e.g., first or second panel) providing, for example, a highest signal strength for the list of channel frequencies.

At block 808, the method 800 includes communicating, by the UE 115 with a BS 105, in at least one of the channel frequencies based on the first antenna configuration. For example, the UE 115 may transmit a communication signal (e.g., measurement report) in a channel frequency from block 804 based on the first antenna configuration. In another example, the UE 115 may receive a communication signal (e.g., measurement report request) in a channel frequency from the block 804 based on the first antenna configuration.

While the disclosure may provide examples in the context of UEs or CPEs operating in LTE and NR FR2 networks, the disclosure applies to devices operating in 5G standalone (SA) mode, 5G non-standalone (NSA) mode, 5G NR TDD FR 1 (in sub-6 GHz), and 5G NR TDD FR 2 (in mmW). The 5G NSA mode refers to a mode of deployment where control plane operations are operated by LTE signal and data plane operations are operated by 5G. The 5G SA mode refers to a mode of deployment where both control and data plane operations are operated by 5G.

In some aspects, a method of wireless communication includes: determining, by a user equipment (UE), a plurality of antenna configurations for a plurality of channel frequencies; determining, by the UE, a set of signal strengths for at least one beam received at one or more antenna configurations of the plurality of antenna configurations for at least one of the channel frequencies; selecting, based on the set of signal strengths, a first antenna configuration of the plurality of antenna configurations; and communicating, by the UE with a base station (BS), in the at least one of the channel frequencies based on the first antenna configuration.

In some instances, at least one channel frequency of the plurality of channel frequencies is preconfigured. In some instances, the method further includes receiving, by the UE from the BS, an instruction to de-configure a channel frequency of the plurality of channel frequencies, where determining a set of signal strengths includes determining a signal strength for at least one beam received at the first antenna configuration for the channel frequency after the receiving an instruction. In some instances, the method further includes setting, by the UE, an antenna panel of the UE to orient to a first spatial direction based on the first antenna configuration. In an instance, determining a set of signal strengths includes determining a set of signal strengths for at least one beam received at a motorized rotatable antenna panel of the UE, and the setting an antenna panel includes setting the motorized rotatable antenna panel based on the first antenna configuration. In an instance, determining a set of signal strengths includes determining a set of signal strengths for at least one beam received at a multi-panel of the UE, and the setting an antenna panel includes setting the multi-panel based on the first antenna configuration. In an instance, the method further includes: triggering, by the UE, a radio link failure (RLF) after the setting an antenna panel of the UE; camping, by the UE, on a long-term evolution (LTE) network; receiving, by the UE, a measurement report request specifying a set of millimeter wave (mmW) channel frequencies; and performing, by the UE, a set of measurements for at least one mmW channel frequencies of the set of mmW channel frequencies based on the first antenna configuration, wherein the communicating in the at least one of the channel frequencies includes transmitting a measurement report based on the set of measurements.

In some instances, determining a set of signal strengths includes: setting, by the UE, an antenna panel of the UE based on the one or more antenna configurations of the plurality of antenna configurations; and scanning, by the UE, at least one of the channel frequencies based on the one or more antenna configurations to determine a signal strength of the set of signal strengths. In some instances, at least one of the set of signal strengths is based on at least one of a signal-to-interference-and-noise ratio (SINR) measurement, a reference signal received power (RSRP) measurement, received signal strength indicator (RSSI), a reference signal received quality (RSRQ), or a spectral efficiency (SPEFF) measurement, or combinations thereof, in the respective channel frequency. In some instances, the method further includes for one or more channel frequencies of the plurality of channel frequencies: determining, by the UE, a given antenna configuration of the plurality of antenna configurations providing a highest signal strength for the respective channel frequency; and storing an association between the given antenna configuration and the respective channel frequency in a database.

In some instances, the method further includes selecting the first antenna configuration having a greatest number of highest signal strengths above a threshold for the plurality of channel frequencies. In some instances, the method further includes selecting the first antenna configuration having a highest signal strength of the set of signal strengths. In some instances, the method further includes selecting the first antenna configuration having a signal strength of the set of signal strengths above a threshold for at least one of the channel frequencies.

In some instances, the method further includes entering, by the UE, an antenna configuration selection mode, where determining a set of signal strengths and selecting a first antenna configuration are performed while the UE is in the antenna configuration selection mode. In an instance, the method further includes exiting, by the UE, the antenna configuration selection mode in response to determining that at least one signal strength of the set of signal strengths for the at least one of the channel frequencies is greater than a signal quality threshold. In an instance, entering an antenna configuration selection mode is performed in response to detection of a trigger, where the trigger includes at least one of an initial installation of the UE, an output signal from a motion sensor included in the UE, an activation of a physical button on the UE, an activation of a touchscreen button displayed on a display coupled to the UE, an RLF at the UE, an expiration of a recurring timer, a start of a new power cycle at the UE, or combinations thereof. In an instance, the method further includes camping, by the UE, on a LTE network, where entering an antenna configuration selection mode is performed in response to camping on the LTE network. In an instance, the method further includes receiving, by the UE from the BS, a measurement report request specifying a set of mmW channel frequencies, where entering an antenna configuration selection mode is performed in response to receiving the measurement report request. In an instance, the method further includes, while the UE is in a connected mode in a network, receiving, by the UE from the BS, a measurement report request specifying a channel frequency, where entering an antenna configuration selection mode is performed in response to receiving the measurement report request.

In some instances, the method further includes: camping, by the UE, on an LTE network; entering, by the UE, an idle mode after the camping; and while the UE is in the idle mode, performing a set of measurements for each channel frequency of the plurality of channel frequencies based on the first antenna configuration. In some instances, the method further includes: establishing, by the UE with the BS, a connection to a new radio (NR) network; entering, while the UE is connected to the NR network, a connected mode discontinuous reception (CDRX) power off mode; and while the UE is in the CDRX power off mode, performing a set of measurements for each channel frequency of the plurality of channel frequencies based on the first antenna configuration. In some instances, the set of signal strengths is determined using a beam sweep operation in the one or more frequencies for the one or more antenna configurations.

In some aspects, an apparatus includes: a memory; and a processor configured to, when executing instructions stored on the memory, cause the apparatus to: determine a plurality of antenna configurations for a plurality of channel frequencies; determine a set of signal strengths for at least one beam received at one or more antenna configurations of the plurality of antenna configurations for at least one of the channel frequencies; select, based on the set of signal strengths, a first antenna configuration of the plurality of antenna configurations; and communicate, with a base station (BS), in the at least one of the channel frequencies based on the first antenna configuration.

In some instances, at least one channel frequency of the plurality of channel frequencies is preconfigured. In some instances, the processor is configured to, when executing instructions stored on the memory, cause the apparatus to: receive, from the BS, an instruction to de-configure a channel frequency of the plurality of channel frequencies; and determine a signal strength for at least one beam received at the first antenna configuration for the channel frequency after the instruction is received. In some instances, the apparatus includes an antenna panel, where the processor is configured to, when executing instructions stored on the memory, cause the apparatus to set the antenna panel to orient to a first spatial direction based on the first antenna configuration. In some instances, the antenna panel includes a motorized rotatable antenna panel. In some instances, the antenna panel includes a multi-panel. In some instances, the processor is configured to, when executing instructions stored on the memory, cause the apparatus to: trigger a radio link failure (RLF); camp on a long-term evolution (LTE) network after the RLF; perform a set of measurements for one or more millimeter wave (mmW) channel frequencies based on the first antenna configuration; receive a measurement report request specifying at least one mmW channel frequency of the set of mmW channel frequencies; and transmit the measurement report based on the set of measurements.

In some instances, the apparatus includes an antenna panel, where the processor is configured to, when executing instructions stored on the memory, cause the apparatus to: set the antenna panel based on the one or more antenna configurations of the plurality of antenna configurations; and scan at least one of the channel frequencies based on the one or more antenna configurations to determine a signal strength of the set of signal strengths. In some instances, each of the set of signal strengths is based on at least one of a signal-to-interference-and-noise ratio (SINR) measurement, a reference signal received power (RSRP) measurement, received signal strength indicator (RSSI), a reference signal received quality (RSRQ), or a spectral efficiency (SPEFF) measurement, or combinations thereof, in the respective channel frequency. In some instances, the processor is configured to, when executing instructions stored on the memory, cause the apparatus to, for one or more channel frequencies of the plurality of channel frequencies: determine a given antenna configuration of the plurality of antenna configurations providing a highest signal strength for the respective channel frequency; and store an association between the given antenna configuration and the respective channel frequency in a database. In some instances, the processor is configured to, when executing instructions stored on the memory, cause the apparatus to select the first antenna configuration having a greatest number of highest signal strengths above a threshold for the plurality of channel frequencies. In some instances, the processor is configured to, when executing instructions stored on the memory, cause the apparatus to select the first antenna configuration having a highest signal strength of the set of signal strengths. In some instances, the processor is configured to, when executing instructions stored on the memory, cause the apparatus to select the first antenna configuration having a signal strength of the set of signal strengths above a threshold for at least one of the channel frequencies.

In some instances, the processor is configured to, when executing instructions stored on the memory, cause the apparatus to: enter an antenna configuration selection mode; and determine the set of signal strengths and select the first antenna configuration while in the antenna configuration selection mode. In some instances, the processor is configured to, when executing instructions stored on the memory, cause the apparatus to exit the antenna configuration selection mode in response to a determination that at least one signal strength of the set of signal strengths for the at least one of the channel frequencies is greater than a signal quality threshold. In some instances, the processor is configured to, when executing instructions stored on the memory, cause the apparatus to enter the antenna configuration selection mode in response to detection of a trigger, where the trigger includes at least one of an initial installation, an output signal from a motion sensor, an activation of a physical button, an activation of a touchscreen button displayed on a display, an RLF, an expiration of a recurring timer, a start of a new power cycle, or combinations thereof.

In some instances, the processor is configured to, when executing instructions stored on the memory, cause the apparatus to: receive, from the BS, a measurement report request specifying a set of mmW channel frequencies; and enter the antenna configuration selection mode in response to receiving the measurement report request. In some instances, the processor is configured to, when executing instructions stored on the memory, cause the apparatus to: camp on an LTE network; enter an idle mode after camping on the LTE network; and perform, while in the idle mode, a set of measurements for each channel of the plurality of channel frequencies based on the first antenna configuration. In some instances, the processor is configured to, when executing instructions stored on the memory, cause the apparatus to: establish a connection to a new radio (NR) network; enter, while connected to the NR network, a connected mode discontinuous reception (CDRX) power off mode; and perform, while in the CDRX power off mode, a set of measurements for each channel frequency of the plurality of channel frequencies based on the first antenna configuration. In some instances, the processor is configured to, when executing instructions stored on the memory, cause the apparatus to enter an antenna configuration selection mode via an application.

In some aspects, a computer-readable medium having program code recorded thereon, the program code including: code for causing a user equipment (UE) to determine a plurality of antenna configurations for a plurality of channel frequencies; code for causing the UE to determine a set of signal strengths for at least one beam received at one or more antenna configurations of the plurality of antenna configurations for at least one of the channel frequencies; code for causing the UE to select, based on the set of signal strengths, a first antenna configuration of the plurality of antenna configurations; and code for causing the UE to communicate with a base station (BS), in the at least one of the channel frequencies based on the first antenna configuration.

In some instances, at least one channel frequency of the plurality of channel frequencies is preconfigured. In some instances, the program code further includes code for causing the UE to set an antenna panel of the UE to orient to a first spatial direction based on the first antenna configuration. In some instances, each of the set of signal strengths is based on at least one of a signal-to-interference-and-noise ratio (SINR) measurement, a reference signal received power (RSRP) measurement, received signal strength indicator (RSSI), a reference signal received quality (RSRQ), or a spectral efficiency (SPEFF) measurement, or combinations thereof, in the respective channel frequency. In some instances, the program code further includes for one or more channel frequencies of the plurality of channel frequencies: code for causing the UE to determine a given antenna configuration of the plurality of antenna configurations providing a highest signal strength for the respective channel frequency; and code for causing the UE to store an association between the given antenna configuration and the respective channel frequency in a database.

In some instances, the program code further includes code for causing the UE select the first antenna configuration having a greatest number of highest signal strengths above a threshold for the plurality of channel frequencies. In some instances, the program code further includes code for causing the UE select the first antenna configuration having a highest signal strength of the set of signal strengths. In some instances, the program code further includes code for causing the UE select the first antenna configuration having a signal strength of the set of signal strengths above a threshold for at least one of the channel frequencies. In some instances, the code for causing the UE to determine the set of signal strengths includes code for causing the UE to determine the set of signal strengths using a beam sweep operation in the one or more frequencies for the one or more antenna configurations.

In some aspects, an apparatus includes: means for determining a plurality of antenna configurations for a plurality of channel frequencies; means for determining a set of signal strengths for at least one beam received at one or more antenna configurations of the plurality of antenna configurations for at least one of the channel frequencies; means for selecting, based on the set of signal strengths, a first antenna configuration of the plurality of antenna configurations; and means for communicating, with a base station (BS), in the at least one of the channel frequencies based on the first antenna configuration.

In some instances, at least one channel frequency of the plurality of channel frequencies is preconfigured. In some instances, the apparatus further includes means for setting an antenna panel to orient to a first spatial direction based on the first antenna configuration. In some instances, at least of the set of signal strengths is based on at least one of a signal-to-interference-and-noise ratio (SINR) measurement, a reference signal received power (RSRP) measurement, received signal strength indicator (RSSI), a reference signal received quality (RSRQ), or a spectral efficiency (SPEFF) measurement, or combinations thereof, in the respective channel frequency. In some instances, the apparatus further includes for one or more channel frequencies of the plurality of channel frequencies: means for determining a given antenna configuration of the plurality of antenna configurations providing a highest signal strength for the respective channel frequency; and means for storing an association between the given antenna configuration and the respective channel frequency in a database. In some instances, the apparatus further includes means for selecting the first antenna configuration having a greatest number of highest signal strengths above a threshold for the plurality of channel frequencies. In some instances, the apparatus further includes means for selecting the first antenna configuration having a highest signal strength of the set of signal strengths. In some instances, the apparatus further includes means for selecting the first antenna configuration having a signal strength of the set of signal strengths above a threshold for at least one of the channel frequencies.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), comprising:
   determining a plurality of antenna configurations for a plurality of channel frequencies, each of the plurality of antenna configurations being associated with a corresponding antenna panel angle;
   determining a set of signal strengths for at least one reference signal received from a base station (BS) at one or more antenna configurations of the plurality of antenna configurations for at least one of the channel frequencies;
   selecting, based on the set of signal strengths, a first antenna configuration of the plurality of antenna configurations, the first antenna configuration being associated with a first antenna panel angle;
   setting, based on the first antenna configuration, an antenna panel of the UE to orient to a first spatial direction;
   performing, by the UE, a set of measurements for one or more millimeter wave (mmW) channel frequencies based on the first antenna configuration; and
   transmitting, to the BS based on the first antenna configuration and the set of measurements, a measurement report.

2. The method of claim 1, wherein at least one channel frequency of the plurality of channel frequencies is preconfigured.

3. The method of claim 1, further comprising:
   receiving, by the UE from the BS, an instruction to de-configure a channel frequency of the plurality of channel frequencies, wherein the determining a set of signal strengths includes determining a signal strength for at least one reference signal received at the first antenna configuration for the channel frequency after the receiving an instruction.

4. The method of claim 1, wherein the determining a set of signal strengths includes determining a set of signal strengths for at least one reference signal received at a motorized rotatable antenna panel of the UE, and wherein the setting an antenna panel includes setting the motorized rotatable antenna panel based on the first antenna configuration.

5. The method of claim 1, wherein the determining a set of signal strengths includes determining a set of signal strengths for at least one reference signal received at a multi-panel of the UE, and wherein the setting an antenna panel includes setting the multi-panel based on the first antenna configuration.

6. The method of claim 1, further comprising:
   triggering, by the UE, a radio link failure (RLF) after the setting an antenna panel of the UE;
   camping, by the UE, on a long-term evolution (LTE) network;
   receiving, by the UE, a measurement report request specifying a set of mmW channel frequencies, wherein the transmitting the measurement report is based on the receiving the measurement report request.

7. The method of claim 1, wherein the determining a set of signal strengths includes:
   setting, by the UE, an antenna panel of the UE based on the one or more antenna configurations of the plurality of antenna configurations; and
   scanning, by the UE, at least one of the channel frequencies based on the one or more antenna configurations to determine a signal strength of the set of signal strengths.

8. The method of claim 1, wherein at least one of the set of signal strengths is based on at least one of a signal-to-interference-and-noise ratio (SINR) measurement, a reference signal received power (RSRP) measurement, received signal strength indicator (RSSI), a reference signal received quality (RSRQ), or a spectral efficiency (SPEFF) measurement, or combinations thereof, in the respective channel frequency.

9. The method of claim 1, further comprising for one or more channel frequencies of the plurality of channel frequencies:
   determining, by the UE, a given antenna configuration of the plurality of antenna configurations providing a highest signal strength for the respective channel frequency; and
   storing an association between the given antenna configuration and the respective channel frequency in a database.

10. The method of claim 1, further comprising:
    selecting the first antenna configuration having a greatest number of highest signal strengths above a threshold for the plurality of channel frequencies.

11. The method of claim 1, further comprising:
    selecting the first antenna configuration having a highest signal strength of the set of signal strengths.

12. The method of claim 1, further comprising:
    selecting the first antenna configuration having a signal strength of the set of signal strengths above a threshold for at least one of the channel frequencies.

13. The method of claim 1, further comprising:
    entering, by the UE, an antenna configuration selection mode, wherein the determining a set of signal strengths and the selecting a first antenna configuration are performed while the UE is in the antenna configuration selection mode.

14. The method of claim 13, further comprising:
exiting, by the UE, the antenna configuration selection mode in response to determining that at least one signal strength of the set of signal strengths for the at least one of the channel frequencies is greater than a signal quality threshold.

15. The method of claim 13, wherein the entering an antenna configuration selection mode is performed in response to detection of a trigger, wherein the trigger includes at least one of an initial installation of the UE, an output signal from a motion sensor included in the UE, an activation of a physical button on the UE, an activation of a touchscreen button displayed on a display coupled to the UE, an RLF at the UE, an expiration of a recurring timer, a start of a new power cycle at the UE, or combinations thereof.

16. The method of claim 13, further comprising:
camping, by the UE, on a LTE network, wherein the entering an antenna configuration selection mode is performed in response to camping on the LTE network.

17. The method of claim 13, further comprising:
receiving, by the UE from the BS, a measurement report request specifying a set of mmW channel frequencies, wherein the entering an antenna configuration selection mode is performed in response to receiving the measurement report request.

18. The method of claim 13, further comprising:
while the UE is in a connected mode in a network, receiving, by the UE from the BS, a measurement report request specifying a channel frequency, wherein the entering an antenna configuration selection mode is performed in response to receiving the measurement report request.

19. The method of claim 1, further comprising:
camping, by the UE, on an LTE network;
entering, by the UE, an idle mode after the camping; and
while the UE is in the idle mode, performing a set of measurements for each channel frequency of the plurality of channel frequencies based on the first antenna configuration.

20. The method of claim 1, further comprising:
establishing, by the UE with the BS, a connection to a new radio (NR) network;
entering, while the UE is connected to the NR network, a connected mode discontinuous reception (CDRX) power off mode; and
while the UE is in the CDRX power off mode, performing a set of measurements for each channel frequency of the plurality of channel frequencies based on the first antenna configuration.

21. The method of claim 1, wherein the set of signal strengths is determined using a beam sweep operation in the one or more channel frequencies for the one or more antenna configurations.

22. An apparatus, comprising:
a memory;
an antenna panel; and
a processor configured to, when executing instructions stored on the memory, cause the apparatus to:
determine a plurality of antenna configurations for a plurality of channel frequencies, each of the plurality of antenna configurations being associated with a corresponding antenna panel angle;
determine a set of signal strengths for at least one reference signal received at one or more antenna configurations of the plurality of antenna configurations for at least one of the channel frequencies;
select, based on the set of signal strengths, a first antenna configuration of the plurality of antenna configurations, the first antenna configuration being associated with a first antenna panel angle;
set, based on the first antenna configuration, the antenna panel to orient to a first spatial direction;
perform, by the UE, a set of measurements for one or more millimeter wave (mmW) channel frequencies based on the first antenna configuration; and
transmit, to the BS based on the first antenna configuration and the set of measurements, a measurement report.

23. The apparatus of claim 22, wherein at least one channel frequency of the plurality of channel frequencies is preconfigured.

24. The apparatus of claim 22, wherein the processor is configured to, when executing instructions stored on the memory, cause the apparatus to:
receive, from the BS, an instruction to de-configure a channel frequency of the plurality of channel frequencies; and
determine a signal strength for at least one reference signal received at the first antenna configuration for the channel frequency after the instruction is received.

25. The apparatus of claim 22, wherein the antenna panel includes a motorized rotatable antenna panel.

26. The apparatus of claim 22, wherein the antenna panel includes a multi-panel.

27. The apparatus of claim 22, wherein the processor is configured to, when executing instructions stored on the memory, cause the apparatus to:
trigger a radio link failure (RLF);
camp on a long-term evolution (LTE) network after the RLF;
receive a measurement report request specifying at least one mmW channel frequency of the set of mmW channel frequencies, wherein the processor is configured to perform the set of measurements based on the measurement report request.

28. The apparatus of claim 22, further comprising:
an antenna panel, wherein the processor is configured to, when executing instructions stored on the memory, cause the apparatus to:
set the antenna panel based on the one or more antenna configurations of the plurality of antenna configurations; and
scan at least one of the channel frequencies based on the one or more antenna configurations to determine a signal strength of the set of signal strengths.

29. The apparatus of claim 22, wherein each of the set of signal strengths is based on at least one of a signal-to-interference-and-noise ratio (SINR) measurement, a reference signal received power (RSRP) measurement, received signal strength indicator (RSSI), a reference signal received quality (RSRQ), or a spectral efficiency (SPEFF) measurement, or combinations thereof, in the respective channel frequency.

30. The apparatus of claim 22, wherein the processor is configured to, when executing instructions stored on the memory, cause the apparatus to:
for one or more channel frequencies of the plurality of channel frequencies:

determine a given antenna configuration of the plurality of antenna configurations providing a highest signal strength for the respective channel frequency; and store an association between the given antenna configuration and the respective channel frequency in a database.

31. The apparatus of claim 22, wherein the processor is configured to, when executing instructions stored on the memory, cause the apparatus to:

select the first antenna configuration having a greatest number of highest signal strengths above a threshold for the plurality of channel frequencies.

32. The apparatus of claim 22, wherein the processor is configured to, when executing instructions stored on the memory, cause the apparatus to:

select the first antenna configuration having a highest signal strength of the set of signal strengths.

33. The apparatus of claim 22, wherein the processor is configured to, when executing instructions stored on the memory, cause the apparatus to:

select the first antenna configuration having a signal strength of the set of signal strengths above a threshold for at least one of the channel frequencies.

34. The apparatus of claim 22, wherein the processor is configured to, when executing instructions stored on the memory, cause the apparatus to:

enter an antenna configuration selection mode; and determine the set of signal strengths and select the first antenna configuration while in the antenna configuration selection mode.

35. The apparatus of claim 34, wherein the processor is configured to, when executing instructions stored on the memory, cause the apparatus to:

exit the antenna configuration selection mode in response to a determination that at least one signal strength of the set of signal strengths for the at least one of the channel frequencies is greater than a signal quality threshold.

36. The apparatus of claim 34, wherein the processor is configured to, when executing instructions stored on the memory, cause the apparatus to:

enter the antenna configuration selection mode in response to detection of a trigger, wherein the trigger includes at least one of an initial installation, an output signal from a motion sensor, an activation of a physical button, an activation of a touchscreen button displayed on a display, an RLF, an expiration of a recurring timer, a start of a new power cycle, or combinations thereof.

37. The apparatus of claim 34, wherein the processor is configured to, when executing instructions stored on the memory, cause the apparatus to:

receive, from the BS, a measurement report request specifying a set of mmW channel frequencies; and enter the antenna configuration selection mode in response to receiving the measurement report request.

38. The apparatus of claim 22, wherein the processor is configured to, when executing instructions stored on the memory, cause the apparatus to:

camp on an LTE network;

enter an idle mode after camping on the LTE network; and perform, while in the idle mode, a set of measurements for each channel of the plurality of channel frequencies based on the first antenna configuration.

39. The apparatus of claim 22, wherein the processor is configured to, when executing instructions stored on the memory, cause the apparatus to:

establish a connection to a new radio (NR) network;

enter, while connected to the NR network, a connected mode discontinuous reception (CDRX) power off mode; and perform, while in the CDRX power off mode, a set of measurements for each channel frequency of the plurality of channel frequencies based on the first antenna configuration.

40. The apparatus of claim 22, wherein the processor is configured to, when executing instructions stored on the memory, cause the apparatus to:

enter an antenna configuration selection mode via an application.

41. A computer-readable medium having program code recorded thereon, the program code comprising:

code for causing a user equipment (UE) to determine a plurality of antenna configurations for a plurality of channel frequencies, each of the plurality of antenna configurations being associated with a corresponding antenna panel angle;

code for causing the UE to determine a set of signal strengths for at least one reference signal received at one or more antenna configurations of the plurality of antenna configurations for at least one of the channel frequencies;

code for causing the UE to select, based on the set of signal strengths, a first antenna configuration of the plurality of antenna configurations, the first antenna configuration being associated with a first antenna panel angle;

code for causing the UE to set, based on the first antenna configuration, an antenna panel of the UE to orient to a first spatial direction;

code for causing the UE to perform, by the UE, a set of measurements for one or more millimeter wave (mmW) channel frequencies based on the first antenna configuration; and code for causing the UE to transmit, to the BS based on the first antenna configuration and the set of measurements, a measurement report.

42. The computer-readable medium of claim 41, wherein at least one channel frequency of the plurality of channel frequencies is preconfigured.

43. The computer-readable medium of claim 41, wherein each of the set of signal strengths is based on at least one of a signal-to-interference-and-noise ratio (SINR) measurement, a reference signal received power (RSRP) measurement, received signal strength indicator (RSSI), a reference signal received quality (RSRQ), or a spectral efficiency (SPEFF) measurement, or combinations thereof, in the respective channel frequency.

44. The computer-readable medium of claim 41, the program code further comprising for one or more channel frequencies of the plurality of channel frequencies:

code for causing the UE to determine a given antenna configuration of the plurality of antenna configurations providing a highest signal strength for the respective channel frequency; and code for causing the UE to store an association between the given antenna configuration and the respective channel frequency in a database.

45. The computer-readable medium of claim 41, further comprising:

code for causing the UE select the first antenna configuration having a greatest number of highest signal strengths above a threshold for the plurality of channel frequencies.

46. The computer-readable medium of claim 41, further comprising:
code for causing the UE select the first antenna configuration having a highest signal strength of the set of signal strengths.

47. The computer-readable medium of claim 41, further comprising:
code for causing the UE select the first antenna configuration having a signal strength of the set of signal strengths above a threshold for at least one of the channel frequencies.

48. The computer-readable medium of claim 41, wherein the code for causing the UE to determine the set of signal strengths includes code for causing the UE to determine the set of signal strengths using a beam sweep operation in the one or more channel frequencies for the one or more antenna configurations.

49. An apparatus, comprising:
means for determining a plurality of antenna configurations for a plurality of channel frequencies, each of the plurality of antenna configurations being associated with a corresponding antenna panel angle;
means for determining a set of signal strengths for at least one reference signal received at one or more antenna configurations of the plurality of antenna configurations for at least one of the channel frequencies;
means for selecting, based on the set of signal strengths, a first antenna configuration of the plurality of antenna configurations, the first antenna configuration being associated with a first antenna panel angle;
means for setting, based on the first antenna configuration, an antenna panel of the UE to orient to a first spatial direction;
means for performing, by the UE, a set of measurements for one or more millimeter wave (mmW) channel frequencies based on the first antenna configuration; and
means for transmitting, to the BS based on the first antenna configuration and the set of measurements, a measurement report.

50. The apparatus of claim 49, wherein at least one channel frequency of the plurality of channel frequencies is preconfigured.

51. The apparatus of claim 49, wherein at least of the set of signal strengths is based on at least one of a signal-to-interference-and-noise ratio (SINR) measurement, a reference signal received power (RSRP) measurement, received signal strength indicator (RSSI), a reference signal received quality (RSRQ), or a spectral efficiency (SPEFF) measurement, or combinations thereof, in the respective channel frequency.

52. The apparatus of claim 49, further comprising for one or more channel frequencies of the plurality of channel frequencies:
means for determining a given antenna configuration of the plurality of antenna configurations providing a highest signal strength for the respective channel frequency; and
means for storing an association between the given antenna configuration and the respective channel frequency in a database.

53. The apparatus of claim 49, further comprising:
means for selecting the first antenna configuration having a greatest number of highest signal strengths above a threshold for the plurality of channel frequencies.

54. The apparatus of claim 49, further comprising:
means for selecting the first antenna configuration having a highest signal strength of the set of signal strengths.

55. The apparatus of claim 49, further comprising:
means for selecting the first antenna configuration having a signal strength of the set of signal strengths above a threshold for at least one of the channel frequencies.

* * * * *